United States Patent
Bischoff et al.

(10) Patent No.: US 10,988,929 B2
(45) Date of Patent: Apr. 27, 2021

(54) CONCRETE COMPONENT HAVING A REINFORCING ELEMENT, METHOD FOR PRODUCING SAME, METHOD FOR BENDING A REINFORCING BAR OF A REINFORCING ELEMENT, AND BENDING DEVICE

(71) Applicant: Solidian GmbH, Albstadt (DE)

(72) Inventors: Thomas Bischoff, Bisingen (DE); Marcus Hinzen, Sigmaringen (DE); Georgios Toskas, Albstadt (DE)

(73) Assignee: Solidian GmbH, Albstadt (DE)

( * ) Notice: Subject to any disclaimer, the term of this patent is extended or adjusted under 35 U.S.C. 154(b) by 0 days.

(21) Appl. No.: 16/083,236

(22) PCT Filed: Feb. 28, 2017

(86) PCT No.: PCT/EP2017/054575
§ 371 (c)(1),
(2) Date: Sep. 7, 2018

(87) PCT Pub. No.: WO2017/153202
PCT Pub. Date: Sep. 14, 2017

(65) Prior Publication Data
US 2019/0085563 A1 Mar. 21, 2019

(30) Foreign Application Priority Data
Mar. 7, 2016 (DE) .......................... 102016104071.1

(51) Int. Cl.
*E04C 5/07* (2006.01)
*B29B 15/12* (2006.01)

(52) U.S. Cl.
CPC .............. *E04C 5/07* (2013.01); *B29B 15/125* (2013.01)

(58) Field of Classification Search
CPC ................................ E04C 5/07; B29B 15/125
(Continued)

(56) References Cited

U.S. PATENT DOCUMENTS 3,515,623 A * 6/1970 Bates ........................ D03J 1/00
428/193
3,627,601 A * 12/1971 Hayes ................... B29B 15/125
156/73.2
(Continued)

FOREIGN PATENT DOCUMENTS

DE 4009986 A1 10/1991
DE 4110622 C2 12/1995
(Continued)

OTHER PUBLICATIONS

German Office Action dated Feb. 26, 2018, for corresponding German Application No. 10 2016 104 071.1 (10 pgs.).
(Continued)

*Primary Examiner* — Patrick J Maestri
*Assistant Examiner* — Joseph J. Sadlon
(74) *Attorney, Agent, or Firm* — Fitch, Even, Tabin & Flannery LLP

(57) ABSTRACT

A concrete component has a concrete matrix (49) and at least one non-metal reinforcing element (50), which can be shaped and at least one reinforcing part (29). The at least one reinforcing part (29) has a plurality of reinforcing threads (34) or reinforcing yarn arranged in a plastic matrix of a plastic (K). The plastic (K) is designed to be reversibly cross-linked. The cross-links can be released by heating the plastic (K) and reestablished by cooling the plastic back down. Thus, it is possible to produce and store a reinforcing element in completely hardened form as a standard element. In one application, the produced reinforcing element can be reshaped into the desired shape by releasing the cross-links
(Continued)

in one or more locations, reshaping the reinforcing element, and then hardening the reinforcing element again by reestablishing the cross-links.

28 Claims, 11 Drawing Sheets

(58) Field of Classification Search
USPC ...................................................... 52/649.1
See application file for complete search history.

(56) References Cited

U.S. PATENT DOCUMENTS

| | | | | |
|---|---|---|---|---|
| 3,797,193 | A * | 3/1974 | Haller | B21F 27/20 |
| | | | | 52/669 |
| 4,169,186 | A * | 9/1979 | Tazaki | B05D 7/20 |
| | | | | 428/406 |
| 4,265,979 | A * | 5/1981 | Baehr | B28B 1/521 |
| | | | | 156/39 |
| 4,335,177 | A * | 6/1982 | Takeuchi | B28B 1/522 |
| | | | | 442/244 |
| 4,560,411 | A * | 12/1985 | Melchior | E04C 5/012 |
| | | | | 264/45.1 |
| 4,958,961 | A * | 9/1990 | Herbst | E04C 5/07 |
| | | | | 405/259.5 |
| 5,322,738 | A * | 6/1994 | Breidenbach | B28B 1/522 |
| | | | | 156/142 |
| 5,395,689 | A | 3/1995 | Dethlefs | |
| 5,512,232 | A | 4/1996 | Addeo | |
| 5,641,856 | A | 6/1997 | Meurs | |
| 5,836,715 | A * | 11/1998 | Hendrix | B29B 15/125 |
| | | | | 404/134 |
| 5,965,467 | A * | 10/1999 | Stevenson | D03D 9/00 |
| | | | | 405/129.75 |
| 5,972,503 | A * | 10/1999 | Woodside | B29B 15/122 |
| | | | | 156/180 |
| 6,023,903 | A | 2/2000 | Stecker | |
| 6,612,085 | B2 * | 9/2003 | Edwards | E04C 5/03 |
| | | | | 428/397 |
| 8,486,516 | B2 * | 7/2013 | Hauber | B28B 19/0092 |
| | | | | 428/218 |
| 8,673,101 | B2 * | 3/2014 | Brandstrom | B29C 70/32 |
| | | | | 156/173 |
| 9,387,605 | B2 | 7/2016 | Tsukamoto | |
| 9,458,632 | B2 * | 10/2016 | Morris | B32B 18/00 |
| 9,546,490 | B2 * | 1/2017 | Kraus | E04C 5/073 |
| 10,087,630 | B2 * | 10/2018 | Hebel | E04C 5/07 |
| 2004/0194873 | A1 * | 10/2004 | Branca | B29C 70/52 |
| | | | | 156/180 |
| 2012/0309895 | A1 * | 12/2012 | Schmidt | C09J 4/00 |
| | | | | 524/599 |
| 2013/0239503 | A1 * | 9/2013 | Miller | B29C 53/58 |
| | | | | 52/414 |
| 2014/0323001 | A1 | 10/2014 | Schmidt | |
| 2015/0132533 | A1 | 5/2015 | Karle | |

FOREIGN PATENT DOCUMENTS

| | | |
|---|---|---|
| DE | 69414342 T2 | 3/1999 |
| DE | 102010001987 A1 | 8/2011 |
| DE | 102011087226 A1 | 5/2013 |
| DE | 102012108132 B4 | 1/2015 |
| EP | 0292572 A1 | 11/1988 |
| EP | 2666922 A1 | 11/2013 |
| EP | 1853664 B1 | 6/2014 |
| JP | 2011-094247 A | 5/2011 |
| WO | 97/19226 A1 | 5/1997 |
| WO | 98/15403 A1 | 4/1998 |
| WO | 2013/006964 A1 | 1/2013 |
| WO | 2013/170313 A1 | 11/2013 |

OTHER PUBLICATIONS

International Search Report dated Apr. 24, 2017, for corresponding PCT Application No. PCT/EP2017/054575 (4 pgs.).

Manfred Curbach et al., "Textilbeton in Theorie und Praxis" in Tagundsband zum 6. Kolloquium zu textilbewehrten Tragwerken, CTRS6, Sep. 19, 2011 (449 pages).

European Office Action dated Oct. 22, 2019, in corresponding European Application No. 17707849.0, with machine English translation (18 pages).

* cited by examiner

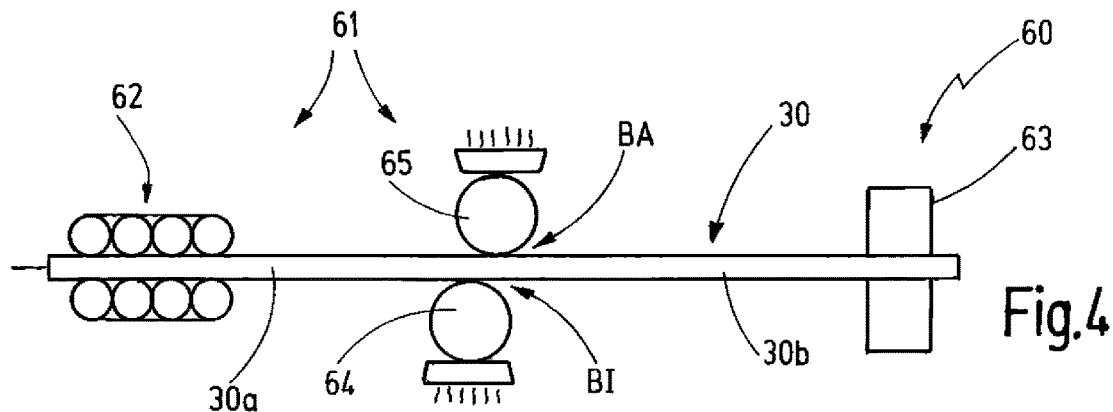
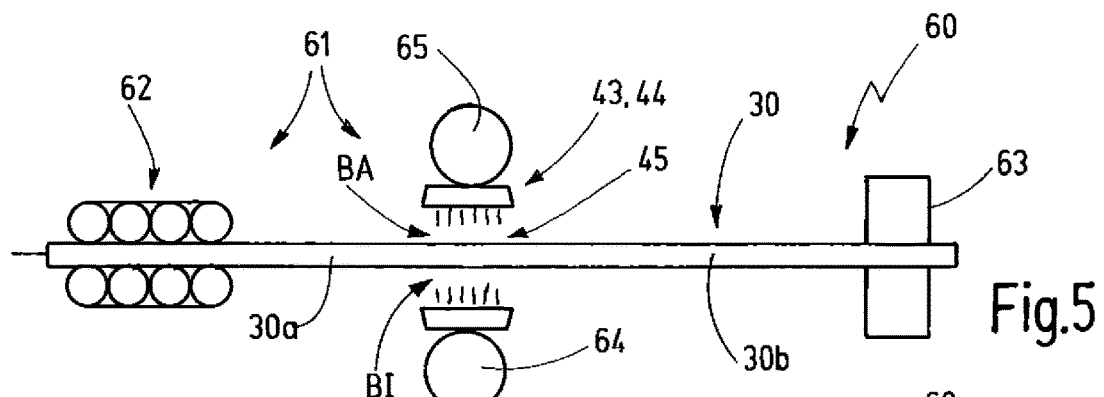
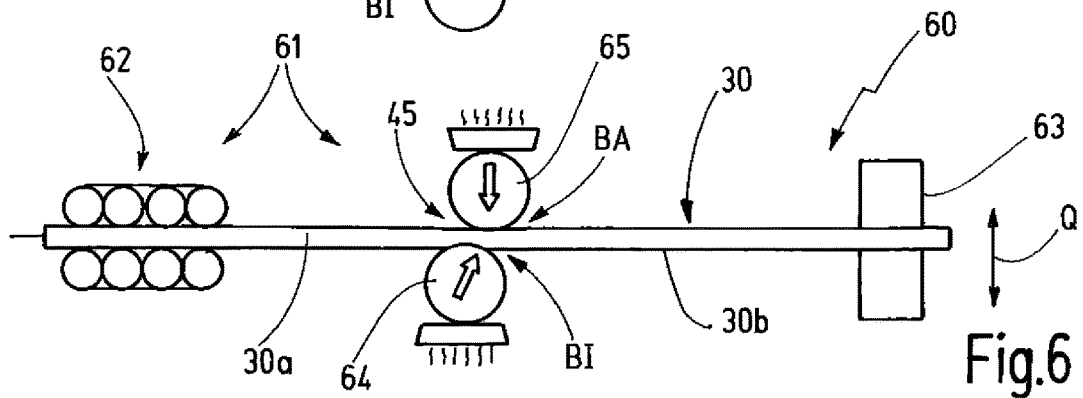
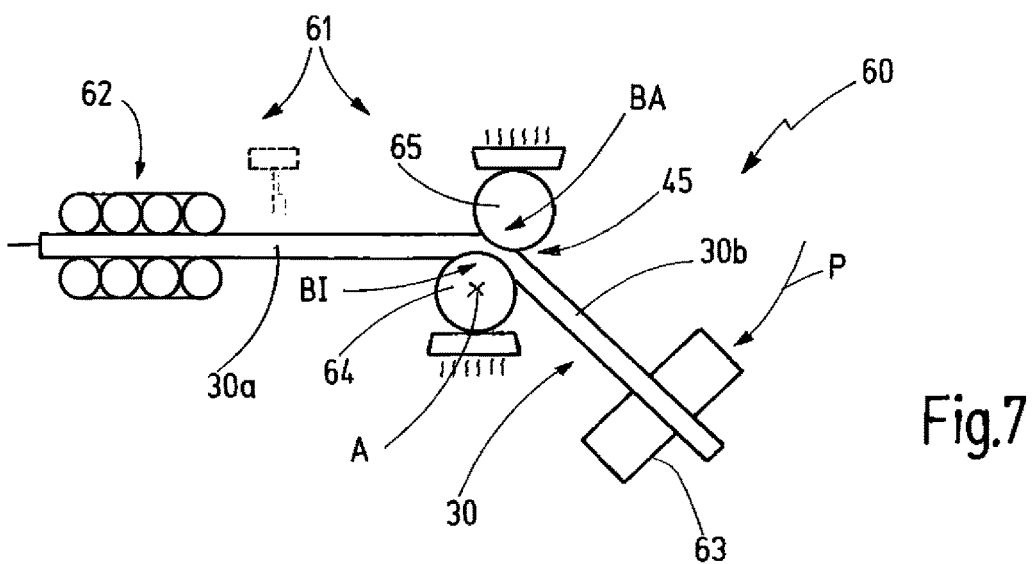

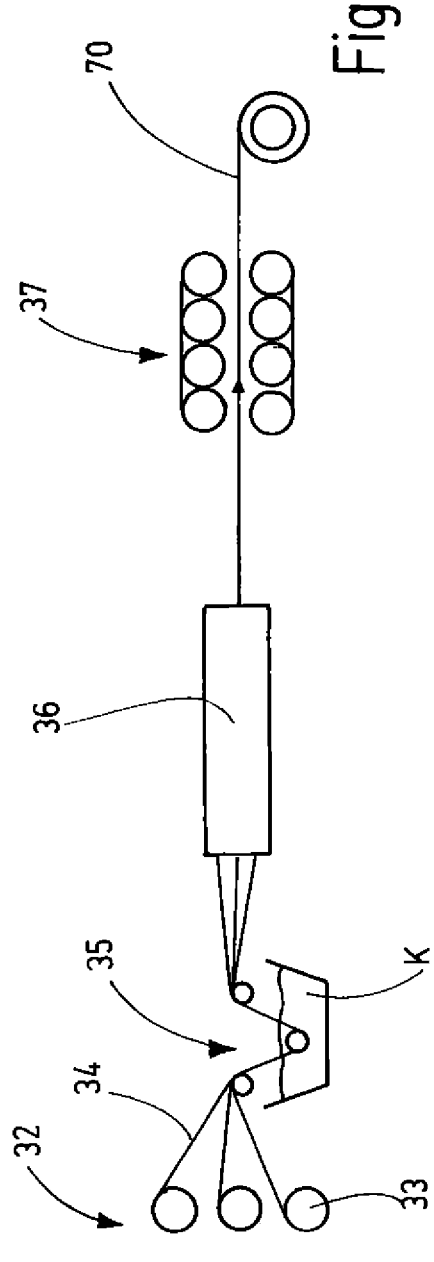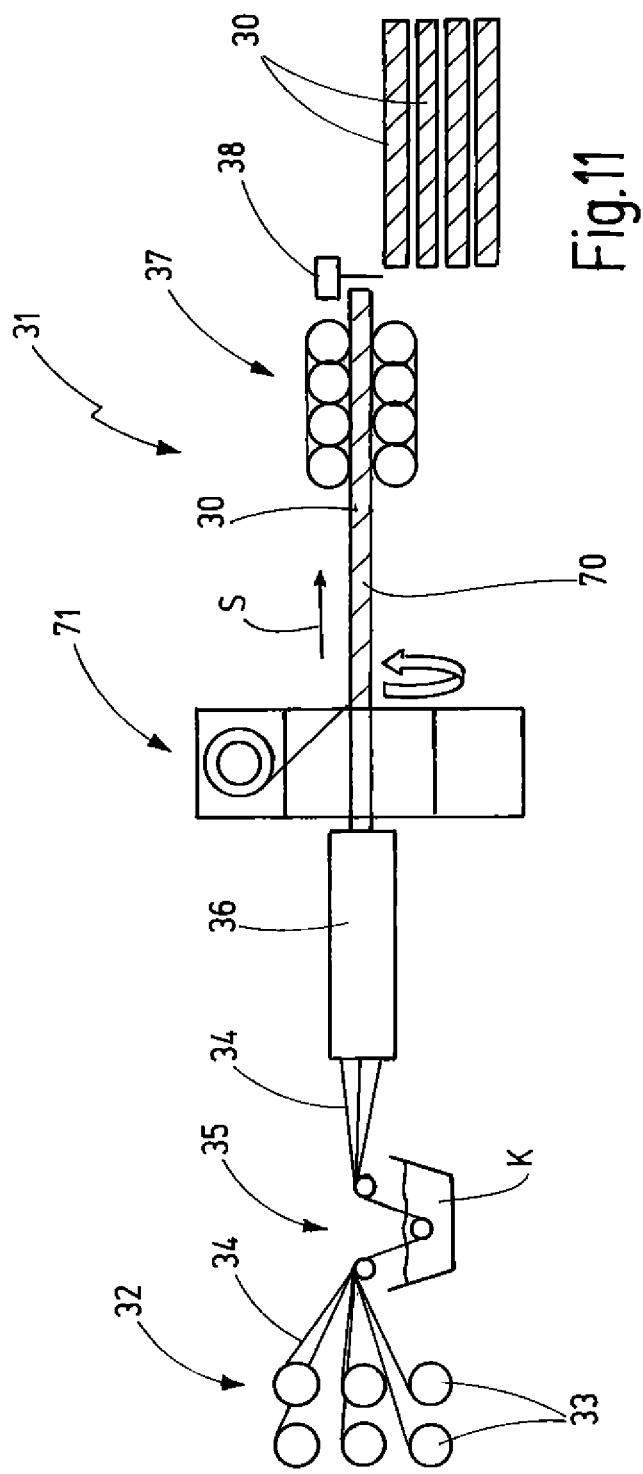

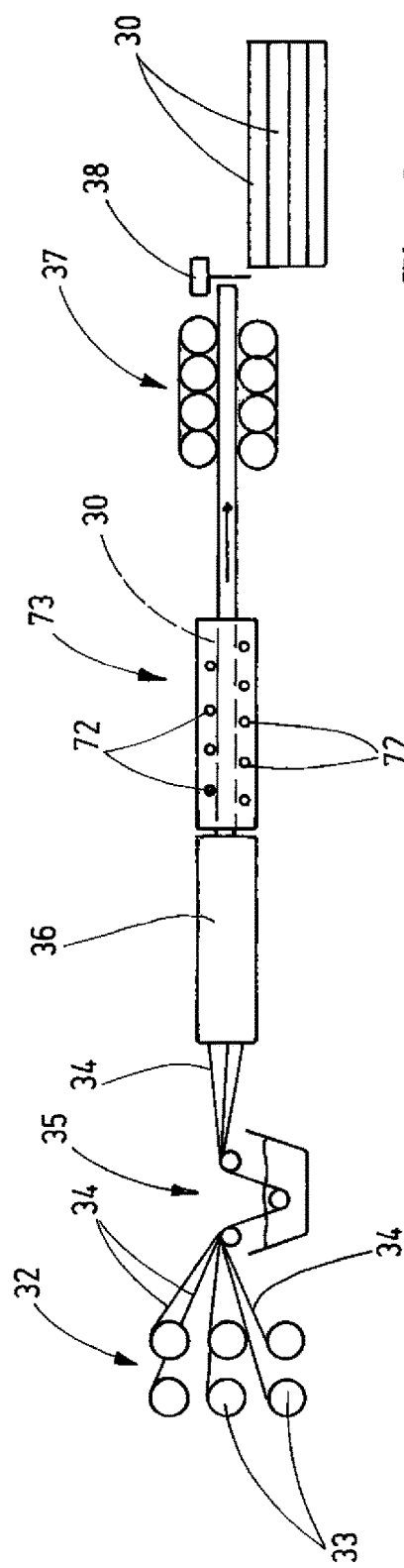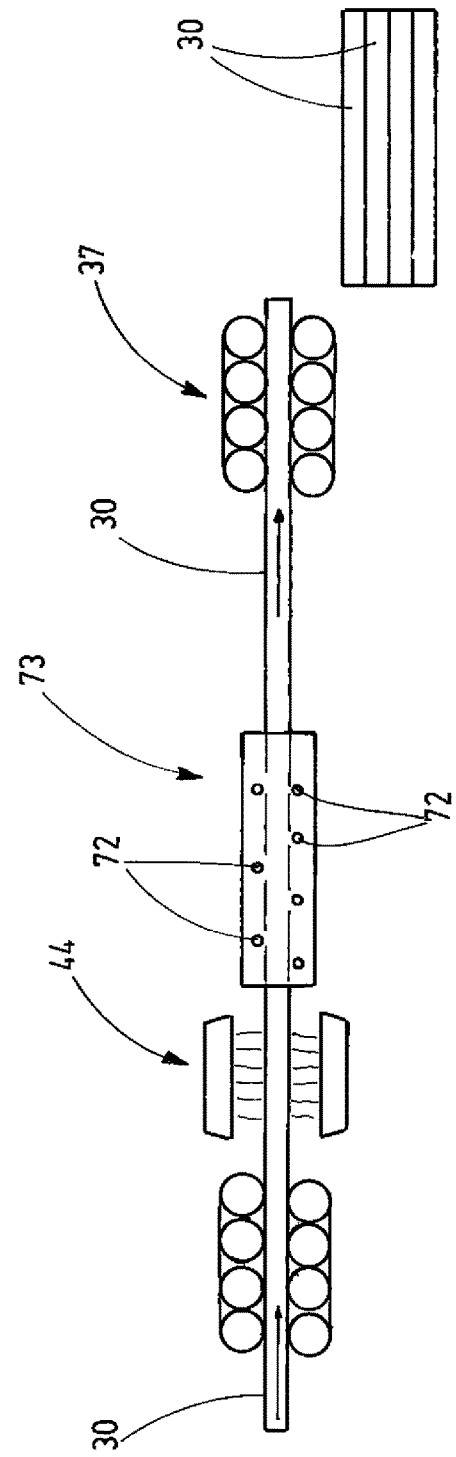

CONCRETE COMPONENT HAVING A REINFORCING ELEMENT, METHOD FOR PRODUCING SAME, METHOD FOR BENDING A REINFORCING BAR OF A REINFORCING ELEMENT, AND BENDING DEVICE

CROSS REFERENCE TO RELATED APPLICATIONS

This patent application is the national phase of PCT/EP2017/054575, filed Feb. 28, 2017, which claims the benefit of German Patent Application No. 10 2016 104 071.1 filed Mar. 7, 2016.

TECHNICAL FIELD

The invention relates to a concrete component having a non-metal reinforcing element which can be shaped for reinforcing the concrete component, a method for producing same, a method for bending a reinforcing bar of a reinforcing element, and a bending device. For example, the reinforcing element of a concrete component can be intended to increase the carrying capacity of the concrete component.

BACKGROUND

Reinforcements for plastics are known today and are already used in many ways in plastic construction. Such reinforcements must meet various requirements. In particular, they are intended to increase the mechanical strength of composite parts (tensile strength, tensile stiffness, crack bridging). The reinforcing elements must not only impart strength, but rather must also allow shaping of the composite material together with the plastic matrix, for example in the construction of boats, airplanes, bicycles, etc. DE 10 2011 087 226 A1 describes a pseudo-thermoplastic, self-cross-linking composite material that can be used for plastic construction and that has a plastic matrix made from a reversibly cross-linked plastic.

Reinforcements for strengthening structures made of mineral binders have different requirements than a composite material for plastic components. They must be resistant to the media used in the mineral concrete component, in particular to alkaline substances. Furthermore, they must be permanently heat-resistant to temperatures up to 80° C. Finally, such reinforcements should be simple and economical to produce and it should be simple to handle them on the construction site. Especially at construction sites, it is necessary that persons that have little or no knowledge of the art be able to create a concrete component in a simple way and to do so without defects.

U.S. Pat. No. 6,612,085 B2 describes a reinforcing bar for concrete structures. The reinforcing bar is made from a composite material of a depolymerizable and repolymerizable thermoplastic resin and longitudinally oriented reinforcing fibers. This is intended to achieve low viscosity during processing. The structure of the reinforcing bar is intended to allow it to be put into any different shape. During depolymerization and repolymerization, the polymer chains are broken up or reassembled, respectively, in the extension direction. This allows the thermoplastic reinforcing bar to be made more shapeable by heating, put into the desired shape, and then hardened again by cooling. After the plastic cools off, it remains a thermoplast.

U.S. Pat. No. 6,023,903 A describes another reinforcing element. It consists of reinforcing fibers that are integrated into a resin. The reinforcing element has multiple flanges that project away from a core, producing a shape with a cross-shaped or star-shaped cross section. In the core, a slot is formed at the location where the reinforcing element is supposed to be bent, so that a flange that is supposed to be curved at the bending point is separated from the core. This allows bending of the reinforcing element, which would otherwise be hindered by the structure with a cross-shaped or star-shaped cross section.

In practice, the plastic matrices used for such composite material reinforcements are mainly thermosetting resins, for example epoxy resin, vinyl ester resin, or polyester resin. Up to now, thermoplastic resins have not been used in practice, since the long-term operating temperatures are too low. In addition, thermoplasts have a tendency to creep, and therefore can reduce the strength of the concrete component. On the other hand, high-temperature thermoplasts are expensive, and some must be processed at very high temperatures, which additionally increases the costs. Moreover, the quality of the bond with the embedded fibers is problematic when thermoplasts are used. There are only a few fibers—that is, roving types with a sizing agent—that ensure a sufficiently good bond for the thermoplastic plastic matrix.

Most reinforcements, especially steel reinforcements at construction sites, are prefabricated. This relates above all to shear reinforcements and starter bars. In order to be able to produce completely steel-free concrete components from composite material reinforcements, it is necessary to provide not only planar, flat reinforcing meshes or straight reinforcing bars, but rather also two-dimensional or three-dimensional bar-shaped or mesh-shaped reinforcing elements that are curved or bent. Today this is accomplished by adapting the composite material reinforcement elements to the specific use during production, producing them ready to be installed, and installing them at the construction site, especially by casting a concrete component. If the composite material has completely hardened, after that the prefabricated reinforcing element can no longer be reshaped. Adaptation, for example in order still to compensate for manufacturing tolerances on the construction site is no longer possible with these prefabricated reinforcing elements. Alternatively, in a not yet completely hardened, partly cross-linked state—which is called "stage B" or also prepreg—although the reinforcing elements made of composite material are still shapeable, they are storable only to a limited extent. The reason why is that even when such prepregs are stored in a cooled state, they continue to react and age. Moreover, cooled storage takes a lot of effort and is expensive.

If prepregs are supposed to be reshaped into a three-dimensional curved and/or bent shape, they are laid over a corresponding mold or laid into a mold and hardened. The reinforcing fibers are not pretensioned and can form waves, at least in places, depending on the shape. This can in turn reduce the tensile strength or tensile stiffness of the reinforcing element.

Due to the mentioned disadvantages relating to the material, the sometimes very high material prices, and the complicated reshaping, concrete components with non-metal reinforcements have not become widely accepted up to now. This gilt, although the problem of corrosion of steel-reinforced concrete components does lead to high maintenance costs and sometimes a lack of durability, such as, e.g., in the area of bridge construction, and therefore there is a great need for concrete components with non-metal reinforcements that are reasonably cost-effective.

Therefore, the goal of this invention can be considered to be to create a concrete component with a reinforcing element that at least partly solves the above problems and in particular ensures this by improved handling with high technical capability.

SUMMARY

A concrete component is created with a reinforcing element made of a composite material. The concrete component is reinforced by integrating the reinforcing element into the mineral concrete matrix. The design, size, shape, etc. of the reinforcing element depends on the application. The reinforcing element has at least one reinforcing part. In the simplest case, the reinforcing element can be a single reinforcing part in the form of a reinforcing bar. Alternatively, the reinforcing element can also be formed by multiple reinforcing bars that are separately produced and then connected with one another. The reinforcing element can also have multiple reinforcing parts and be designed as a reinforcing mesh in the form of a mesh, for example. Multiple reinforcing parts can be connected together and form, e.g., a mesh.

The reinforcing part can extend in one extension direction. The extension direction is, so to speak, the direction in which the reinforcing part extends, and need not be straight. At places where the reinforcing part is curved the extension direction corresponds to a tangent that touches a curved central axis of the reinforcing part or that touches the curvature of the reinforcing part.

The reinforcing element or the reinforcing part has one or more reinforcing threads. The at least one reinforcing thread extends in the extension direction, at least in the rectilinear sections of the reinforcing part. The at least one reinforcing thread is formed of one or more filaments, and can also be called reinforcing yarn. As filaments it is possible to use synthetic fibers and/or natural fibers. Depending on the application, it is possible to use all filaments, even those used up to now, such as glass fibers of different types (e.g., AR glass fibers), carbon fibers, or basalt fibers.

The at least one reinforcing thread is arranged in a plastic matrix of the reinforcing element. Multiple reinforcing threads can be arranged to form a reinforcing mesh with the formation of crossing locations, and be embedded into the plastic matrix in this position. Therefore, the reinforcing threads can form a textile mesh that can be in the form of a weave and/or a laid scrim and/or a knit. To produce the reinforcing element, such a textile mesh in its mesh shape can be embedded into the plastic matrix, for example soaked with plastic in an impregnation bath process, or laid into a mold into which the plastic is then introduced.

The plastic matrix of the composite material of the reinforcing element consists of a reversibly cross-linked plastic. The plastic has multiple components, at least one of which is a polymer. The cross-links between the molecular or polymer chains can be broken by supplying energy, especially thermal energy. If the discussion here mentions that cross-links can be broken, this should be understood to mean that at the place where the energy is supplied not necessarily all, but most of the cross-links of the molecular chains are broken by supplying energy. Thus, supplying energy can break at least 50% or at least 70% or at least 90% of the cross-links that are produced. In this state, workably approximately corresponds to that of a thermoplast.

Such a plastic matrix or the plastic used for the plastic matrix can be reshaped, in particular bent by breaking the cross-links by supplying energy. The cross-links can be broken locally at the corresponding reshaping or bending point. Breaking the cross-links allows the molecular or polymer chains to slide relative to one another, which makes the plastic reshapable. This allows a reinforcing bar that was produced straight to be bent at one or more places and reshaped into any two- or three-dimensional shape. Furthermore, the local releasing of the cross-links also allows multiple reinforcing bars to be connected, e.g., like a mesh, and a reinforcing element to be produced, for example in the form of a reinforcing mesh.

When the reinforcing element (e.g., reinforcing bar or reinforcing mesh) is produced, it can be completely hardened at first. The polymer is in a cross-linked state and has the material properties of a thermoset. There are no limitations on storage times or additional expenses for cooling to avoid aging. The fact that the cross-links can be reversibly broken and reestablished makes it possible to produce standard reinforcing elements and to adapt them, either in the factory or also on site as required, to specific requirements, in particular to connect them with other reinforcing elements or reinforcing bars or to reshape them. The previous limitations on storability of prepregs or the lack of shapeability of completely hardened thermoset reinforcing elements are eliminated. Moreover, the plastic offers properties like those of usual thermosets, with high temperature-stability and a low tendency to creep.

A reinforcing element can be produced in a simple way by preparing one or more reinforcing threads. The at least one reinforcing thread is introduced into the plastic matrix. For example, the at least one reinforcing thread can be soaked in a bath of liquid plastic. Then, the plastic matrix is hardened. To accomplish this, the reinforcing thread(s) included in the not yet hardened plastic is/are arranged in a mold, so that the reinforcing element or the reinforcing bar assumes the desired shape. The plastic matrix is hardened in this mold. As an alternative to soaking the at least one reinforcing thread before inserting it into the mold, it is also possible to arrange the at least one reinforcing thread in the mold, to introduce the liquid plastic of the plastic matrix into the mold, for example to inject it, and then to harden the plastic matrix in the mold.

In both cases it is advantageous if the at least one reinforcing thread is pretensioned with a tensile stress before the plastic of the plastic matrix hardens. This ensures that the at least one reinforcing thread is arranged completely stretched in the reinforcing part of the reinforcing element. This ensures that the tensile strength or tensile stiffness of the reinforcing element that is produced is optimal. Preferably, a reinforcing element in the form of a reinforcing bar is produced as a straight bar without a bending point in the mold. The cross sectional contour of such a bar can be freely chosen. For example, the bar can have a circular cross section.

It is preferred that the plastic of the plastic matrix be cross-linked at room temperature. The plastic can be self-crosslinking with or without the addition of a cross-linker. In the completely hardened state, the plastic forms a plastic similar to a thermoset or has thermoset properties. Supplying energy and releasing the cross-links in a temperature range clearly above the operating temperature range and above the glass transition temperature range makes the thermoset plastic become thermoplastic, and allows it to be reshaped. The energy for releasing the cross-links can be input by radiation, for example infrared radiation and/or UV radiation and/or another electromagnetic radiation. The energy can additionally or alternatively also be input by thermal convection and/or heat conduction and/or ultrasound.

The plastic of the plastic matrix preferably has a glass-transition temperature of at least 50° C. or at least 80° C. or at least 90° C. or at least 100° C. Additionally or alternatively, the glass-transition temperature of the plastic of the plastic matrix is, in particular, no more than 130° C. or no more than 140° C. or no more than 150° C. This can achieve a sufficiently large range in which the plastic matrix can be used. Moreover, it is possible to keep the required supply of energy to release the cross-links small.

Preferably, the reversibly cross-linked plastic can be cross-linked by means of a Diels-Alder reaction and the cross-links can be broken by means of a retro-Diels-Alder reaction.

The plastic can have a first component with at least two dienophilic double bonds and a second component with at least two diene functionalities. The first component and/or the second component can have more than two functionalities.

Preferably, the first component and/or the second component is a polymer, for example a polyacrylate, a polymethacrylate, a polystyrene, a copolymer of one or more of the previously mentioned polymers, a polyacrylonitrile, a polyether, a polyester, a polyamide, a polyester amide, a polyurethane, a polycarbonate, an amorphous and semicrystalline poly-α-olefin, an ethylene propylene diene monomer rubber (EPDM), an ethylene propylene rubber (EPM), a polybutadiene, acrylonitrile-butadiene-styrene (ABS) [rubber], styrene-butadiene rubber (SBR), a polysiloxane, and/or a block and/or comb and/or star copolymer of one or more of these polymers.

The plastic of the plastic matrix is essentially inert with respect to water and alkaline substances, and therefore not only is it itself insensitive with respect to these substances, but also it is as impervious to diffusion as possible, to protect the embedded fibers from such substances as well as possible.

The first component can be a dienophilic component with two dienophile groups, or an isocyanate or amine with at least two functional groups per molecule. It can be an amine, a diamine, a component with a carbon-sulfur double bond and an electron-acceptor group, a trifunctional dithioester linker, a difunctional polymer from a polymerization (ATRP), an isocyanurate, and preferably an isocyanate. It is further preferable if the isocyanate is a diisocyanate, such as, for instance a 2,2,4-trimethyl-1,6-hexamethylene diisocyanate (TMDI) and/or a 3-isocyanatomethyl-3,5,5-trimethylcyclohexyl isocyanate (isophorone diisocyanate, IPDI).

The second component with at least two diene functionalities can be a diene with alcohol or amine functionality, such as, for instance polyhydric alcohols and/or polyfunctional polyamines. In particular, it can be sorbic alcohol and/or sorbic acid. Preferably, the dienophile is a dithioester. It is also possible for the second component to be a polymer that has been obtained by polymerization (ATRP) and functionalized with conjugated diene groups, such as cyclopentadienyl-terminated poly-(methyl methacrylate) (PMMA-$Cp_2$).

Examples of various plastics that can be used as a plastic matrix are also indicated in DE 10 2010 001 987 A1.

The reinforcing element can have multiple reinforcing bars that are connected with one another. At the connection points, these reinforcing bars are preferably connected together exclusively by means of the plastic of the plastic matrix. To produce the connection, energy can supplied to at least one of the reinforcing bars at the connection point, so that the cross-links are released, and contact with or pressure against the respective other reinforcing bar followed by hardening then produces a material bonding connection. Additional means of connection or adhesives are not required. The energy can be input by heat and/or UV radiation and/or ultrasound excitation at the connection point.

This makes it possible to connect together two or more reinforcing parts of the reinforcing element. At every connection point it is possible, by energy input (especially heating or melting of the plastic), first to release at least some of the cross-links, preferably of all reinforcing parts to be connected at the connection point. After the supply of energy ends, cross-links reform at the respective connection point, producing covalent bonds in the entire structure at the connection point. The connection point is very stable, and has only a small tendency to creep. This small tendency to creep is especially advantageous for the concrete component that contains the reinforcing element, since component deformations due to cracking in the concrete turn out to be clearly smaller than in the case of other reinforced concrete components.

Energy can be supplied at connection points selectively, for example even separately. This allows the connection of, e.g., reinforcing bars or other reinforcing parts of the reinforcing element at the connection point to be selective, for example in a mechanized way by means of a robot, a gripper arm, another manipulator, or also manually by a person. Alternatively, energy can also be supplied to the reinforcing bars or other reinforcing parts to be connected at multiple connection points simultaneously or in an area having one or more connection points or in the entire reinforcing part. This allows individual reinforcing parts to be connected at multiple connection points very quickly and simply, for example for simple production of a reinforcing mesh or a reinforcing cage.

Preferably at least one section of, or the entire length of a reinforcing bar or a reinforcing part of the reinforcing element extends in a straight line. Along the straight section or the entire length of the reinforcing part or reinforcing bar, the reinforcing threads are preferably arranged or held in the plastic matrix under tensile stress. This optimizes the tensile strength or tensile stiffness of the reinforcing element.

At least one of the reinforcing parts or reinforcing bars of the reinforcing element can have a bending point. As was explained, the reinforcing threads are held under tensile stress in the plastic matrix, at least outside of this bending point. This tensile stress is also not eliminated by the local release of the cross-links to produce the bending point, but rather is preserved.

At the bending point, at least some of the reinforcing threads can extend at an angle to the extension direction and, in particular, approach the central axis of the at least one reinforcing part or reinforcing bar. At the bending point, an inner bend side can have an inside curvature, and an outer bend side that is opposite the inner bend side with respect to the central axis of the reinforcing bar can have an outside curvature. The amount of inside curvature is greater than the amount of outside curvature. It is especially preferred if as large a proportion as possible of the reinforcing threads at the bending point have an amount of curvature corresponding to the amount of curvature of the central axis of the reinforcing bar. There is no waviness of a reinforcing thread. At the bending point, the compressed reinforcing threads running in the area of the inside curvature are moved away from the inner bend side into the inside of the reinforcing part or reinforcing bar if the reinforcing part or the reinforcing bar is bent. This can avoid waviness due to excessive length of the reinforcing threads running in the area of the inner bend side and improve the tensile stiffness or the tensile strength of the reinforcing part or the reinforcing bar.

The reinforcing element can also have a rough or uneven outside surface. This can improve the bond with the concrete matrix of the concrete component or with another cast component having a matrix made of a mineral building material. It is possible to provide a rib element in the area of the outside surface that projects outward, away from the central axis of the reinforcing bar with respect to the adjacent outside surface. The rib element can be one or more reinforcing threads soaked with the plastic of the plastic matrix that are arranged in the area of the outside surface of a reinforcing bar and that form a projection with a helical shape, for example. This can be done during or after the production of a reinforcing bar.

In order to bend a straight reinforcing bar, energy is input, preferably locally at the bending point, in order to release the cross-links of the plastic of the plastic matrix there. The energy can be input, for example, in the form of heat and/or UV radiation and/or another electromagnetic radiation and/or by ultrasound excitation. Then, the reinforcing bar can be bent and hardened again. During hardening, at least most of the cross-links of the plastic of the plastic matrix are reestablished. In particular, at least 85% or at least 90% or at least 95% of the released cross-links are reestablished.

In order to perform the bending process, it is preferable to use a bending device. The bending device has an energy input device to input the energy at the bending point, for example a heating device and/or an ultrasound device. The heat can be input by heat conduction and/or by thermal convection and/or by thermal radiation. The energy input device can be in contact with the reinforcing bar or it can be arranged at a distance from it. The ultrasound device can release at least some of the cross-links at the bending point by ultrasound excitation.

The bending device also has a tool arrangement. On the inside of the bending point, a first tool part is arranged, this first tool part being set up and serving to support the reinforcing bar on the inside of the bend during bending. For this purpose, the first tool part can have a first working surface whose curvature corresponds to the specified inside curvature to be achieved in the reinforcing bar. Starting from the bending point, a first bar section of the reinforcing bar to be bent projects away in a first direction, and a second bar section projects away in a second direction. In a straight reinforcing bar that still has to be bent, the two directions are oriented opposite one another.

The tool arrangement has a holding device that touches the first bar section [and] that supports the reinforcing bar on the one side of the bending point. The tool arrangement also has a forming tool that is set up to touch the second bar section and to execute the bending movement relative to the holding device and relative to the first tool part. The holding device can be stationary when the forming tool executes the bending movement. It is also possible for both the holding device and the forming tool to be movable, so that the bending movement is performed on both the first and the second sections of the bar.

The support on the first tool part achieves the desired inside curvature on the inside of the bend. Moreover, the first tool part can preferably be set up to press the reinforcing threads in the area of the inside of the bend in the direction toward the central axis, away from the inside of the bend, to prevent waviness of these reinforcing threads.

The tool arrangement can optionally have a second tool part that is set up to touch the outside of the bend of the reinforcing bar at the bending point. The second tool part and the first tool part can exert a force or a pressure on the reinforcing bar at the bending point, at right angles to the bend axis. Preferably, the first and/or second tool part(s) is/are set up to reshape the cross sectional shape of the reinforcing bar at the bending point with respect to the original cross sectional shape of the first bar section or of the second bar section, and to do so before or during bending. In particular, the dimension of the cross section parallel to the bend axis becomes larger, while the dimension of the cross section at right angles to the bend axis and in the direction radial to the curvature become smaller. The reinforcing bar is given a lateral shaping, so to speak, at the bending point. This shaping allows the reinforcing threads to be moved from the inside of the bend and/or the outside of the bend closer to the central axis of the reinforcing bar.

BRIEF DESCRIPTION OF THE DRAWINGS

Advantageous embodiments of the invention follow from the dependent claims, the description, and the drawings. Preferred sample embodiments of the invention are explained in detail below using the attached drawings. The figures are as follows:

FIGS. 4-7 are block diagram-like representations of a process and a device for bending a reinforcing bar;

FIGS. 10 and 11 are block diagrams of a sample embodiment of a process and a device to produce a rib element in the area of the outside surface of a reinforcing bar;

FIGS. 12 and 13 are each a block diagram of a sample embodiment of a process and a device to introduce particles, for example sand, in the plastic of the plastic matrix of a reinforcing bar;

The invention relates to a concrete component 48 with a mineral concrete matrix 49, into which a reinforcing element 50 is embedded. The concrete matrix 49 can have, for example, cement and aggregate, and optionally it can have concrete admixtures or concrete additives.

Figure 27:
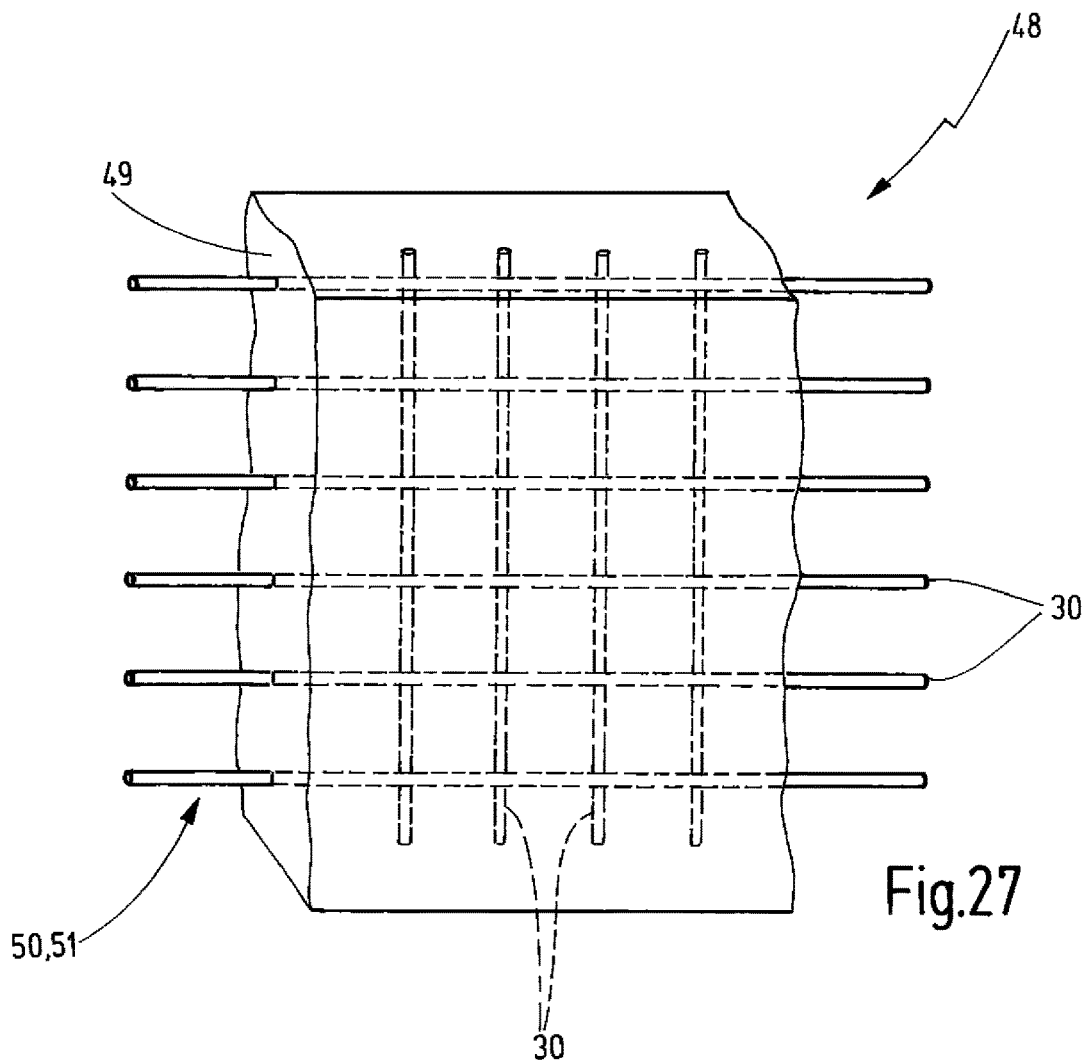
FIG. 27 is a partly cutaway perspective view of a schematic diagram of a concrete component.
Figure 28:
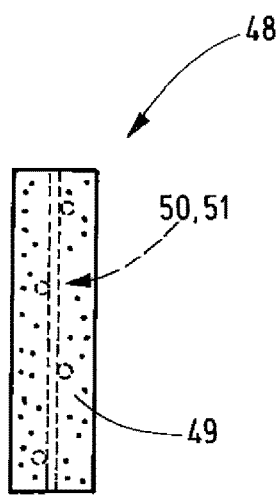
FIGS. 28 through 30 are each top views of schematic representations of various examples of shapes of concrete components.
Figure 29:
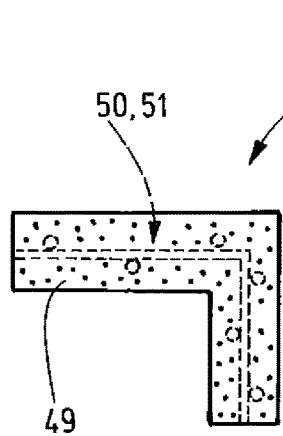
Figure 30:
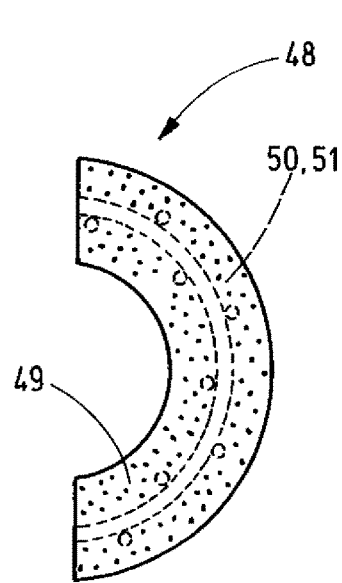

The concrete component 48 and the reinforcing element 50 can be realized in various embodiments. FIGS. 27 through 30 show various sample embodiments of the concrete component 48. It can, for example, be in the shape of a rectangular cuboid (FIGS. 27 and 28). It can also have, when viewed in cross section or top view, one or more bent sections, e.g., its cross section can be a circular arc (FIG. 30). The sample embodiment according to FIG. 29 has a bent cross section, and can form a right angle, for example. Any combinations of the embodiments shown can also be present in a single integral concrete component 48, e.g., one or more corners or angled sections and/or one or more bent sections.

It has at least one reinforcing part 29, that extends in a extension direction S. If the reinforcing element 50 has only one straight reinforcing part 29, it is in the form of reinforcing bar 30. The reinforcing element 50 can also be in the form of a reinforcing mesh 80 with multiple reinforcing parts 29 bordering openings 85 of the reinforcing mesh 80. A mesh shape or any other shape can also be obtained if multiple previously produced reinforcing bars 30 are connected together into a reinforcing element 50.

DETAILED DESCRIPTION

Figure 1:
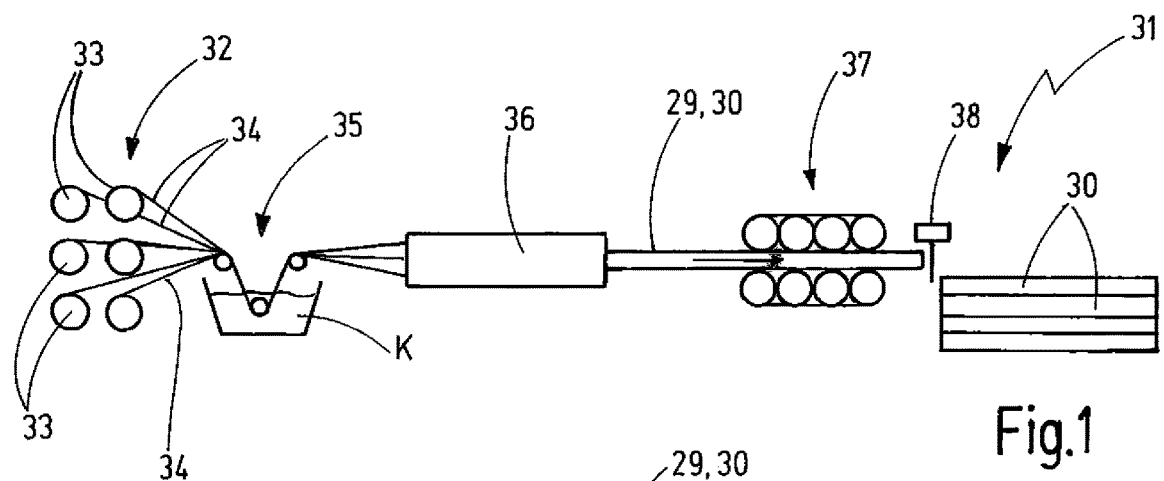
FIG. 1 is a schematic diagram of a sample embodiment of a device and a process to produce a reinforcing bar.
Figure 2:
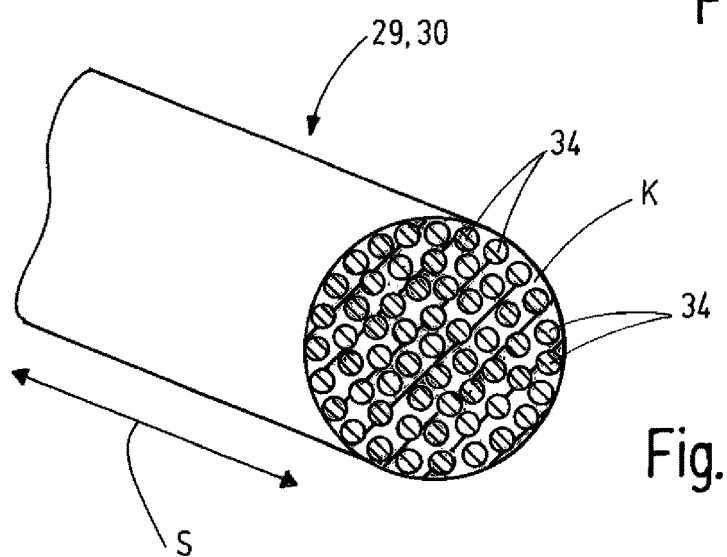
FIG. 2 is a schematic perspective sectional view of a reinforcing bar.

FIG. 1 schematically illustrates a sample embodiment to produce a reinforcing bar 30 in a block diagram-like representation. The production device 31 carries out a pultrusion process, for example. It has a creel 32 with multiple bobbins 33. The bobbins 33 each have reinforcing thread 34 or reinforcing yarn wound on it, which is unwound from the bobbin 33 during the production process. The sample process involves passing the reinforcing threads 34 through a bath 35 of liquid plastic K, soaking them with the plastic K. The plastic K adheres at least to the outside surface of the reinforcing threads 34. After that, the reinforcing threads 34 provided with the plastic K are passed into a mold 36, and are partly or completely hardened there in the desired cross sectional contour. A removal device 37, for example driven reels or rollers, transport the hardened reinforcing bar profile out of the mold 36 and finally a cutting off tool 38 cuts it to a desired length. This produces straight reinforcing bars 30. In the sample embodiment, the reinforcing bars 30 have a circular cross sectional shape (FIG. 2). Any other cross sectional contours, for example elliptical, polygonal, or also any cross sectional shapes with curves and/or corners can also be produced. The mold 36 can define the cross sectional shape of the reinforcing bar 30.

The reinforcing bar 30 extends in a extension direction S. In the preferred sample embodiment, the reinforcing bars 30 produced are straight. The reinforcing threads 34, which are integrated into a plastic matrix consisting of the plastic K by hardening the plastic K, are preferably held under tensile stress during the hardening of the plastic K, so that in the reinforcing bar 30 they are under tensile stress as they are integrated into the plastic matrix made of the plastic K. This avoids wavy or kinked reinforcing threads 34 in the reinforcing bar 30 and increases its tensile strength or tensile stiffness.

The tensile stress or stretching of the at least one reinforcing thread 34 can be achieved by using a pultrusion process to produce the reinforcing element 50 and, for example, the reinforcing bar 30, and it is achieved without requiring special additional measures to tension the reinforcing threads 34.

In departure from the sample embodiment illustrated in FIG. 1, the liquid plastic K can also be applied to the reinforcing threads 34 within the mold 36.

The plastic K of the plastic matrix has cross-linked molecular chains, in particular polymer chains. The cross-links arise below the corresponding glass-transition temperature of, e.g., 50° C., 80° C., 100° C., 130° C., or 150° C. The cross-links produce themselves independently, without the addition of a special cross-linker. Therefore, the plastic K can be designated as self-crosslinking. When the cross-links have been made, the properties of the plastic K are essentially those of a thermoset.

Inputting energy into the plastic K of the plastic matrix with the help of an energy input device 43 can release the cross-links. It should be understood that at least part of the cross-links, in particular at least 50%, can be released to make it possible to reshape the reinforcing bar 30 at the place where the cross-links have been released. Preferably at least 80% or at least 90% of the cross-links can be released at the place where the energy has been input. According to the example, to release the cross-links thermal energy is input, for example by means of an energy input device 43 in the form of heating device 44. With the help of the heating device 44, heat can be input by applying thermal radiation and/or by thermal convection and/or by heat conduction locally at a reshaping point or bending point 45 (FIGS. 1-8). This releases the cross-links of the plastic K at the bending point, so that the reinforcing bar 30 can be reshaped, for example bent.

Figure 23:
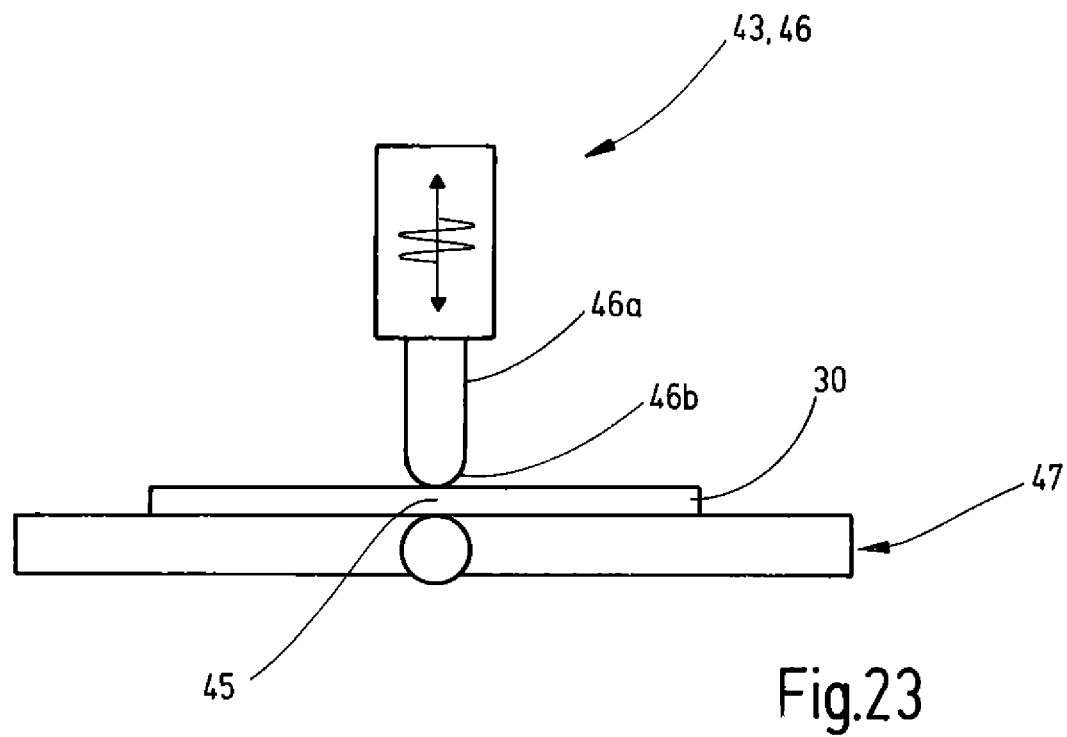
FIGS. 23 and 24 are schematic diagrams of another sample embodiment of a process to reshape a reinforcing bar.
Figure 24:
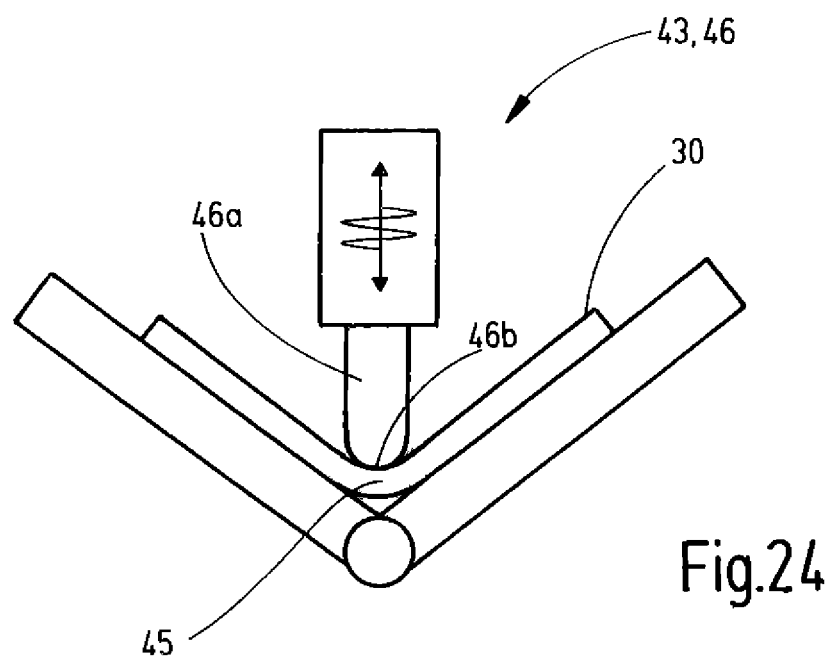

FIGS. 23 and 24 schematically illustrate an energy input device 43 in the form of an ultrasound device. The ultrasound device 46 has an excitation unit for ultrasound excitation, which is connected with a sonotrode 46a. At the end opposite the excitation unit, the sonotrode 46a has a forming tool end 46b. The forming tool end 46b can have, for example, a convexly curved forming tool surface corresponding to an inside radius of curvature to be produced on a reinforcing bar 30.

Arranged opposite the forming tool end 46b, there is a counterholding tool 47 that has, for example, two legs that are mounted on a knee or pivot point so that they can be pivoted toward one another. The bending point of a reinforcing bar 30 to be bent lies on the counterholding tool 47, between the forming tool end 46b and the counterholding tool 47. The ultrasound device 46 inputs energy in the form of ultrasonic vibrations into the reinforcing bar 30 at the bending point 45 or in the area of the bending point 45, so that at least some of the cross-links are released and a flexibility is achieved. Then, a relative motion between the counterholding tool 47 and the forming tool end 46a can bend the reinforcing bar 30 at the bending point 45, as is schematically shown in FIG. 24. This involves the two legs of the counterholding tool 47 folding toward one another according to the desired angle of bend and bending the reinforcing bar 30 around the forming tool end 46b, so to speak.

The ultrasound device 46 can also, for example, produce a connection between two reinforcing bars 30 at a connection point. At the place where a reinforcing bar 30 is supposed to be connected with another reinforcing bar 30, energy can be input through the ultrasound device 46 and release at least some of the cross-links of the plastic K. This energy [input] can be performed at one or both of the reinforcing bars to be connected. Then, the reinforcing bars 30 to be connected are put in contact with one another at the connection point and possibly pressed against one another. Then, the plastic K is hardened again at the connection point by cooling it (for example in the air). When this happens, at least some of the cross-links are reestablished and covalent bonds form in the entire structure at the connection point between the plastics K of the reinforcing bars 30 lying against one another. This can achieve a stable connection with very small tendency to creep.

Figure 25:
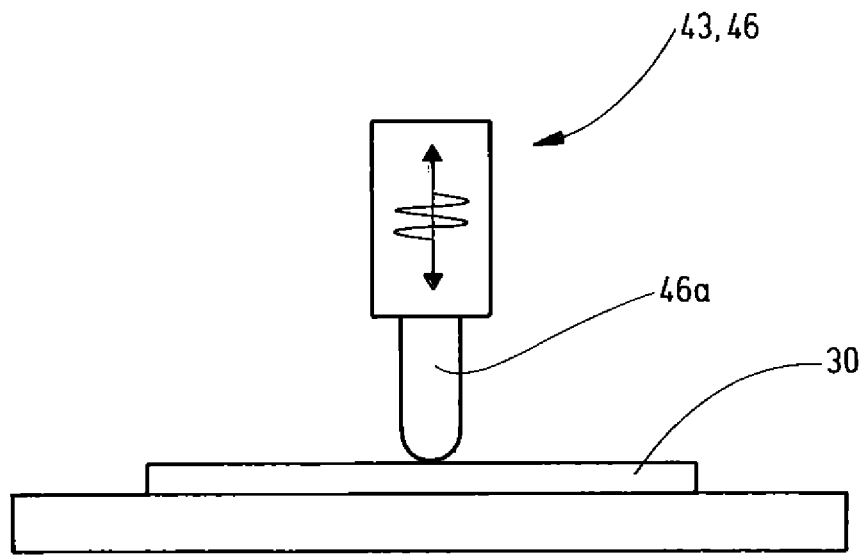
FIGS. 25 and 26 are schematic diagrams of another sample embodiment of a process to connect two reinforcing bars.
Figure 26:
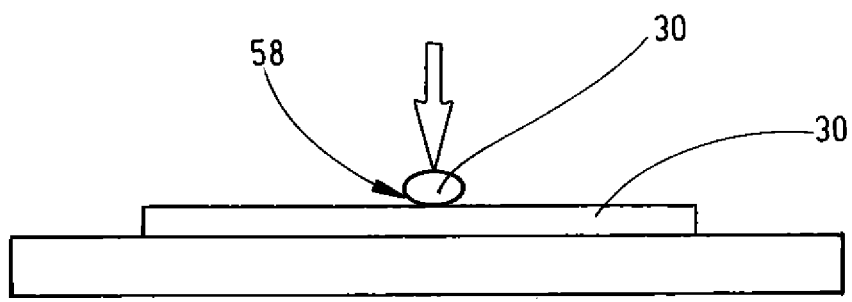

The small tendency to creep is advantageous for the concrete component 48. If a reinforcing element 50, such as, for instance the reinforcing mesh 51 shown in FIG. 25, is produced from multiple reinforcing bars 30 or other individual reinforcing elements, smaller crack widths arise in the concrete component 48 due to the small tendency to creep of the reinforcing element 50. The plastic K is insensitive to water and mineral components of the concrete matrix 49 and therefore is especially well suited for the reinforced concrete component 48. The inventive concrete component 48 is substantially lighter than steel-reinforced concrete components. The load on lower walls or wall sections of a structure can be reduced, with very good stability. The shielding of electromagnetic radiation of such a concrete component 48 is less than that of steel-reinforced concrete components, which can be advantageous when creating inner walls, for example if wireless radio connections (e.g., a WLAN connection) are supposed to be produced in a building.

According to the example, the plastic K has a glass-transition temperature of at least 80° C. to 90° C., preferably over 100° C. Heating the plastic K above the glass-transition temperature releases the cross-links and gives the plastic K a thermoplastic property at the place with the released cross-links, making it deformable. The molecular chains, in particular the polymer chains, can be displaced with respect to one another, achieving deformability.

Recooling causes the plastic K to harden again after the reshaping or bending. At least most of the cross-links are reestablished, for example at least 90% or 95% of them. The thermoplastic properties are lost, and the plastic K regains the thermoset properties that it has below the vitrification temperature.

Figure 3A:
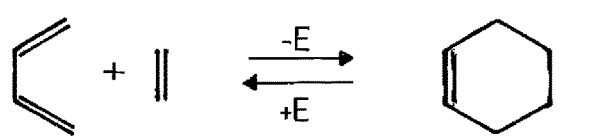
FIG. 3*a* is a greatly simplified reaction scheme illustrating the principle of a Diels-Alder reaction and a retro-Diels-Alder reaction.

Preferably, the plastic K used is a plastic material that can be cross-linked by means of a Diels-Alder reaction and whose cross-links can be broken by means of a retro-Diels-Alder reaction. The Diels-Alder reaction or retro-Diels-Alder reaction is schematically illustrated in FIG. 3. In FIG. 3a, the letter "E" indicates that breaking the cross-links requires an energy input (symbol "+E"), while cooling releases energy in the form of heat from the plastic K (symbol "−E") and the cross-links are reestablished.

Figure 3B:
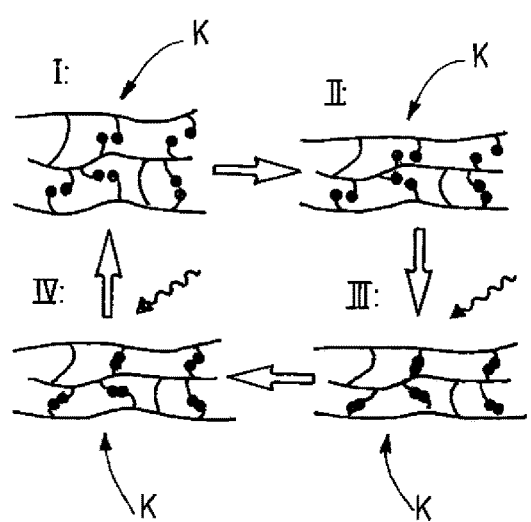
FIG. 3*b* is a greatly simplified schematic diagram of reversible cross-linking caused by irradiation of a plastic with light.
Figure 8:
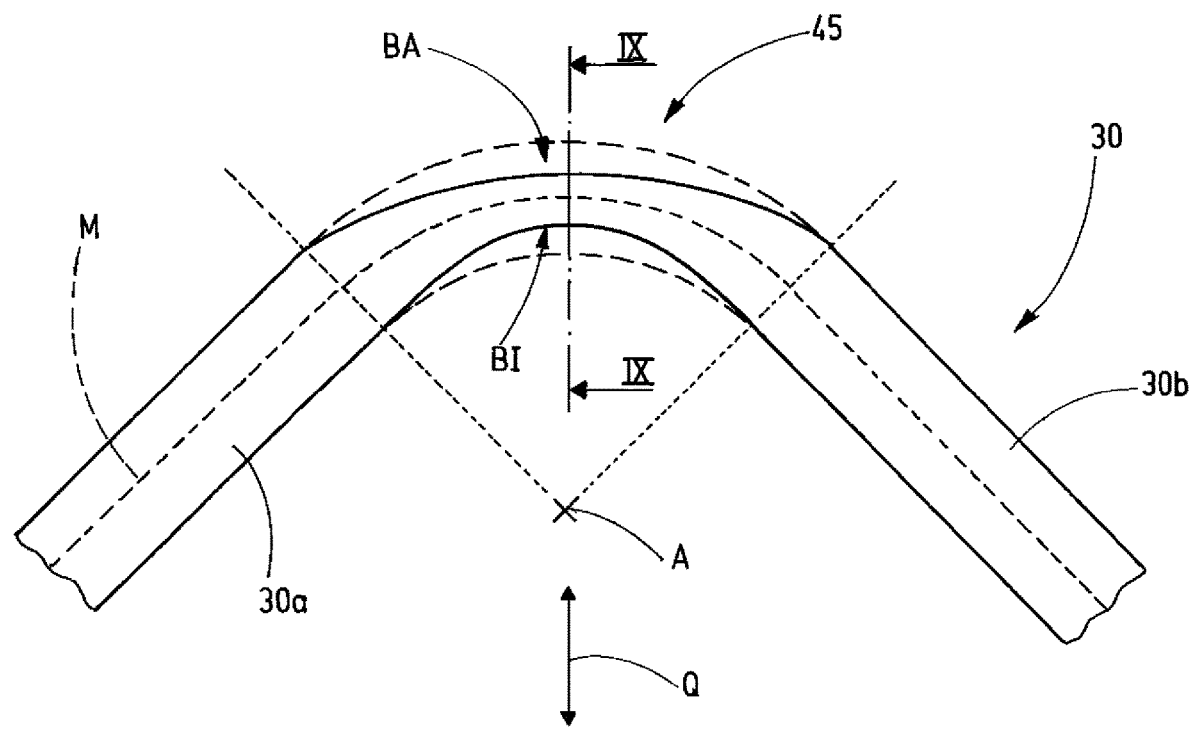
FIG. 8 is a schematic representation of a bent reinforcing bar at the bending point and the adjacent straight sections of the bar.

FIG. 3b shows another possibility of reversible cross-linking. The plastic K used can be a plastic K that is reversibly cross-linkable by means of light, e.g., UV radiation. In the initial state (state I in FIG. 3b) at room temperature, the plastic K has thermoplastic properties and can be deformed. In the state II of FIG. 3b, the plastic K has been put into the desired shape and therefore is under tensile and/or compressive stress. In this state, it can be irradiated with light of a first wavelength $\lambda 1$, causing cross-linking of the cross-links that are have not been connected up to now (state III in FIG. 3b). This gives the plastic K thermoset properties and causes it to maintain its shape, even if external forces no longer act on the material (state IV in FIG. 3b). If the reversible cross-links are supposed to be released again, the plastic K can be irradiated with light of a second wavelength $\lambda 2$, causing it to change back into its initial state with thermoplastic properties, since at least some of the cross-links are released (transition from state IV back to state I). This process can be repeated multiple times.

Photoreactive plastics that allow reversible cross-linking contain, for example, coumarin derivatives, cinnamic acid, cinnamates, and stilbenes ($C_{14}H_2$). For example, a first wavelength $\lambda 1$ above 260 nm can dimerize the double bond of cinnamic acid with adjacent cinnamic acid molecules 1, forming a cyclobutane. The cyclobutane rings formed can be broken by UV light of a second wavelength $\lambda 2$ of less than 260 nm.

1 German original has "ZiNNsäuremolekülen"="stannic acid molecules", almost certainly a typo for "ZiMTsäuremolekülen"="cinnamic acid molecules"—translator.

Photoreactive plastics have two components: molecular photochromic groups, which act as switches, and permanent network structures. The photochromic switches produce photoreversible covalent cross-links, which are formed or broken under the influence of light, depending on the wavelengths. The permanent network structures are cross-linked polymers or penetrating polymer networks. Suitable polymers are ethylene glycol-1-acrylate-2-cinnamic acid and four-arm star poly(ethylene glycol) with cinnamylide-neacetic acid and copolymers of n-butyl acrylate or butyl acrylate with hydroxyethyl methacrylate.

Figure 17:
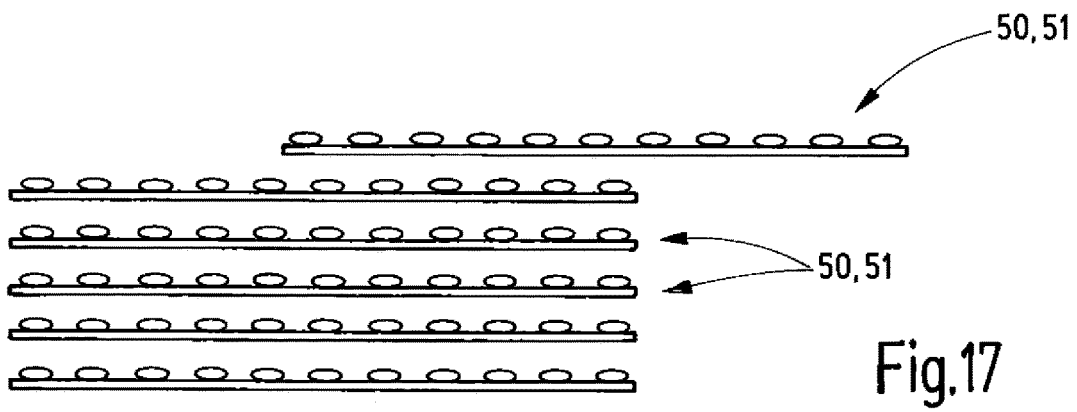
FIGS. 17-19 are schematic diagrams of a sample embodiment of a process to reshape a reinforcing element made from multiple reinforcing bars.
Figure 18:
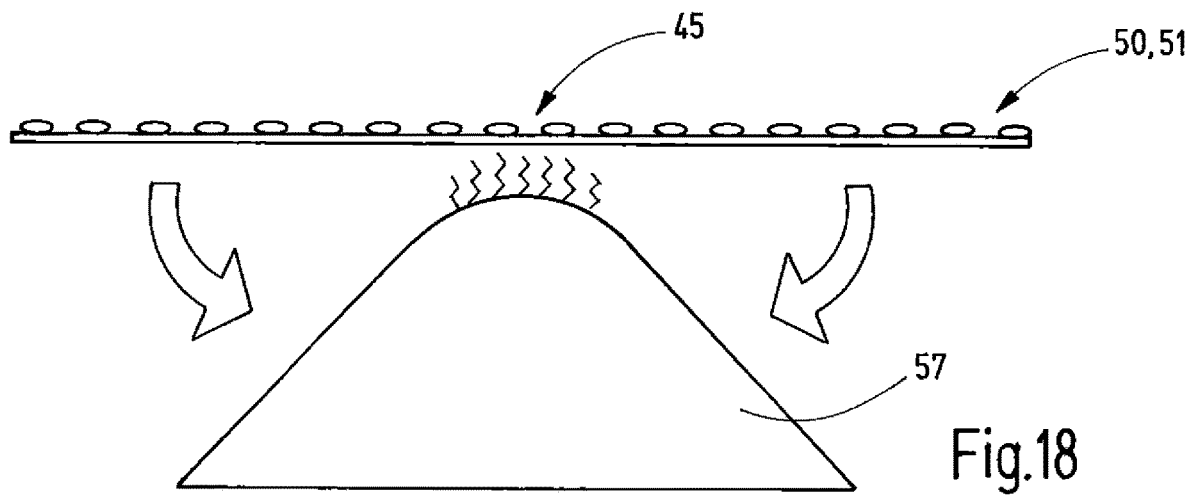
Figure 19:
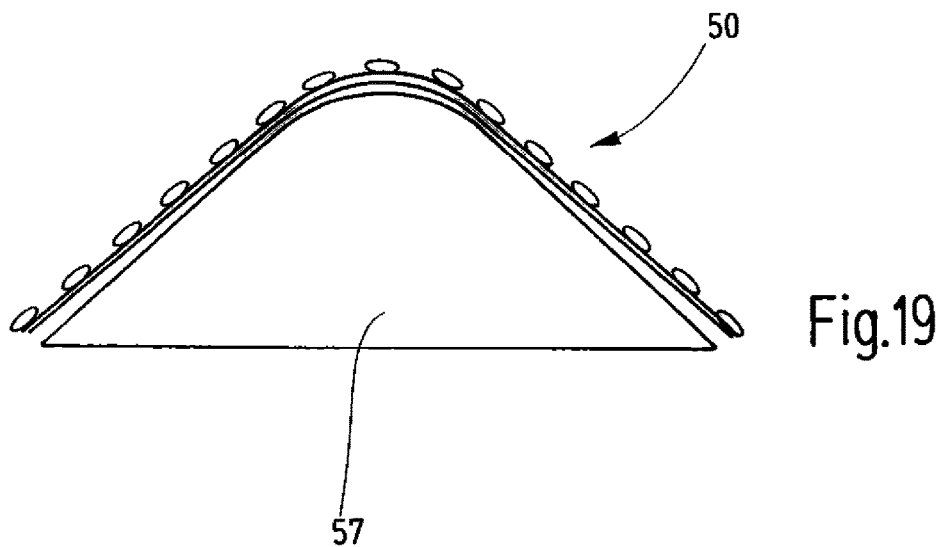

By means of one or more of the described reinforcing bars 30 it is possible to produce a reinforcing element 50. In the simplest case, the reinforcing element 50 is formed by a single reinforcing bar 30. As is illustrated by FIGS. 14-19, it is also possible to use multiple reinforcing bars 30 that have [already] been produced to produce a reinforcing element 50 from them. For example, a reinforcing element 50 with a mesh structure made of crossing reinforcing bars is illustrated. It is also possible to produce any other reinforcing elements 50 with reinforcing bars 30 that are straight and/or that have one or more bending points 45. For example, a reinforcing element 50 can also have multiple straight reinforcing bars 30, between which another reinforcing bar is arranged in a zigzag or wave shape. A reinforcing element 50 can extend mainly in one plane and consequently have an essentially two-dimensional shape, as is illustrated, for example, on the basis of the mesh structure. Such a mesh or another two-dimensional structure can also be put into a three-dimensional shape, an example of which is illustrated by FIGS. 17-19.

Figure 14:
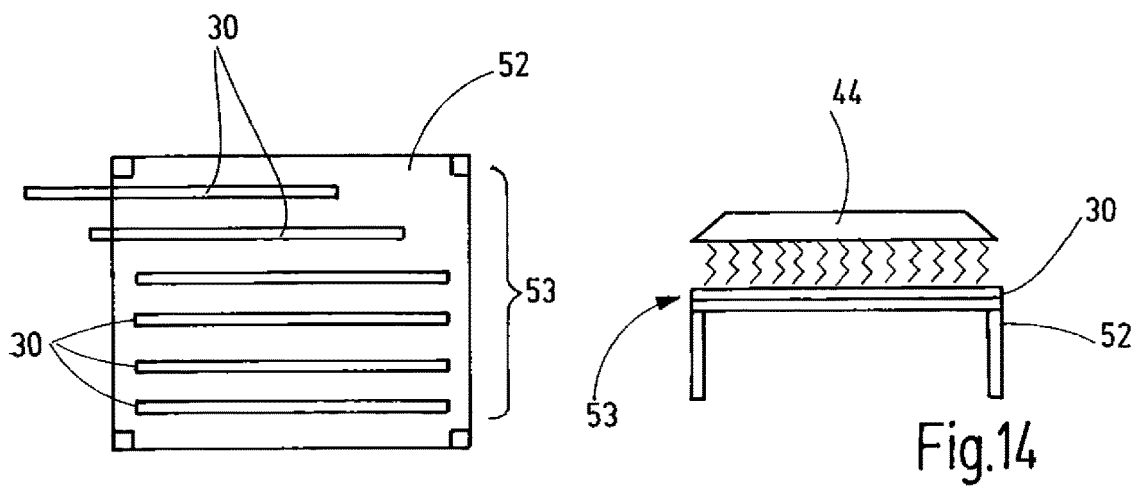
FIGS. 14-16 are block diagrams of a sample embodiment of a device and a process to produce a reinforcing element from multiple reinforcing bars.
Figure 15:
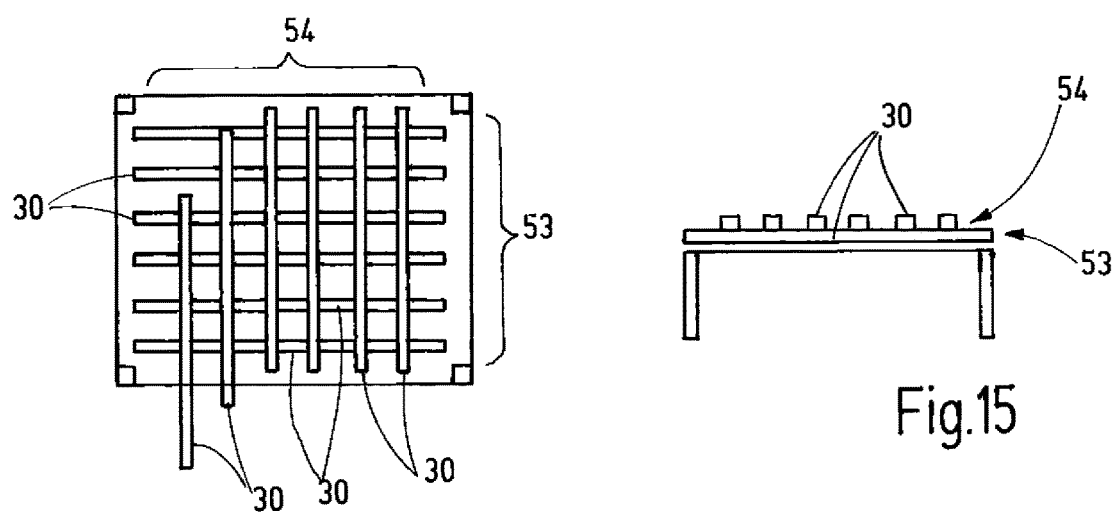
Figure 16:
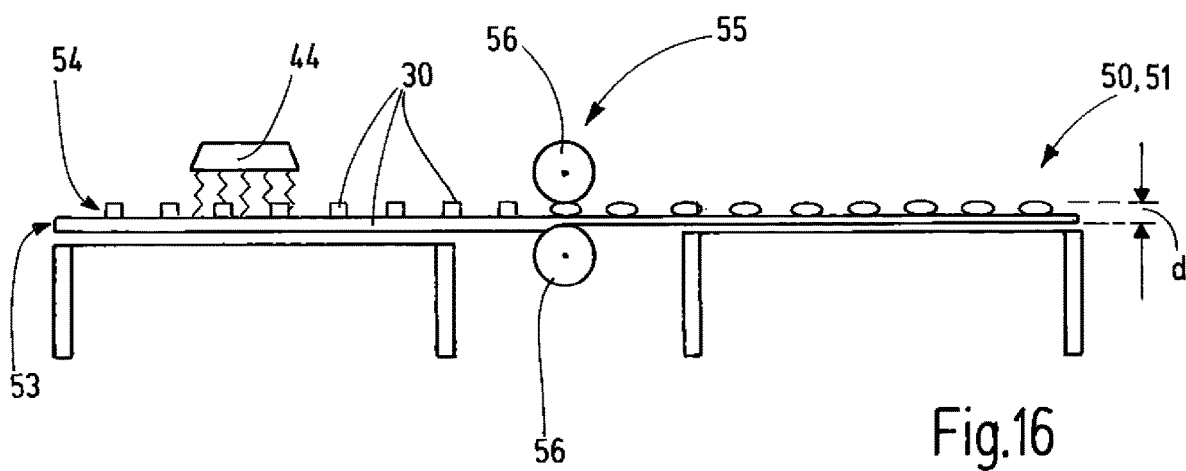

To produce a reinforcing element 50—according to the example a reinforcing mesh 51—first multiple reinforcing bars 30 are arranged parallel to one another on a support 52 and heated with the help of a heating device 44, so that the cross-links are released (FIG. 14). These reinforcing bars 30 form a first layer 53 of reinforcing bars 30. Another, second layer 54 of reinforcing bars 30 is laid onto this first layer 53 of reinforcing bars 30 (FIG. 15). Then, the two layers 53, 54 are squeezed or pressed against one another. This can be done using a pressing arrangement 55. Pressing the reinforcing bars 30 against one another can also change their cross sectional contour. The pressing arrangement 55 can also be used to adjust the thickness d of the reinforcing mesh 51 or the reinforcing element 50 to a desired value.

The pressing arrangement 55 can have, for example, two rotating rollers 56, which are arranged at a distance from one another. The two layers 53, 54 can be transported through the gap between the rollers 56, pressing the two layers 53, 54 against one another. The distance between the lateral surfaces of the two rollers 56 is adjusted so that after the reinforcing bars 30 are pressed against one another the desired thickness d of the reinforcing element 50 is obtained. Before the two layers 53, 54 of the reinforcing bars 30 are pressed together by means of the pressing arrangement 55, they can be heated again by means of a heating device 44. This also releases the cross-links on the reinforcing bars 30 of the second layer 54, improving the connection between the reinforcing bars 30 of the two layers 53, 54 that are lying against one another.

As was already explained above, the energy could be input in way other than heat, for example by ultrasound excitation (FIG. 25). The energy can be input along one area of the reinforcing bars 30, and thus at multiple or all connection points 58 simultaneously (e.g., by the heat of the heating device 44). It is also possible for the energy to be input (e.g., by ultrasound excitation or heat) locally or at certain points, e.g., at one or more connection points 58, for example, with the help of a manipulator or manually.

The reinforcing bars 30 are connected at the crossing or connection points 58 exclusively by the plastic K of the plastic matrix. Additional adhesives or mechanical connection means are not provided. Upon cooling and reestablishment of the cross-links, the plastics K of the touching reinforcing bars 30 connect and form a stable reinforcing element 50.

Figure 20:
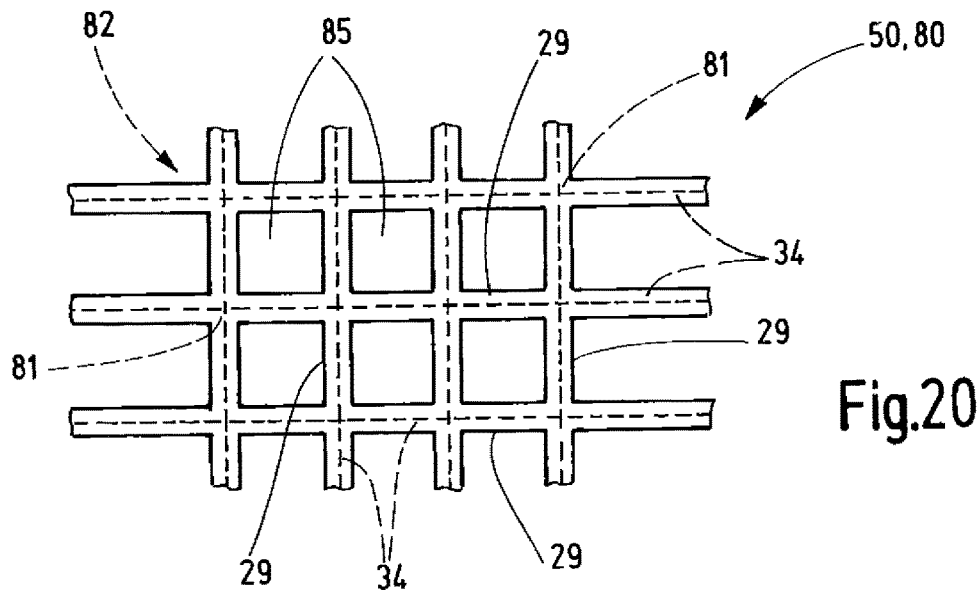
FIG. 20 is a reinforcing element in the form of a reinforcing mesh.

FIG. 20 illustrates a reinforcing element 50 in the form of a reinforcing mesh 80. The reinforcing mesh 80 is formed by multiple reinforcing threads 34 first forming a textile structure 82 with one or more connection points or crossing locations 81. At the crossing location 81, the crossing reinforcing threads 34 can lie loosely on one another or be directly bound together [as] textiles, or be held or connected indirectly through at least one binding thread of a binding system. This textile structure 82 can be in the form of a laid scrim and/or a weave and/or a warp knit and/or a weft knit. It is possible to provide a textile binding only at certain crossing locations 81, while at other crossing locations the reinforcing threads lie loosely against one another in the form of a laid scrim or a float or something of that kind. If the textile structure 82 is formed by a weave, any bindings can be realized, such as, for instance a linen weave, a body weave, an atlas weave, a cross weave, etc. The weave types can also be combined with one another in any way.

This textile structure 82 as a whole is embedded into a plastic matrix. Thus, in this sample embodiment the reinforcing mesh 80 arises not by first producing reinforcing bars 30 and then connecting them, but rather by first producing the textile structure 82 and then embedding it in a plastic matrix.

Figure 21:
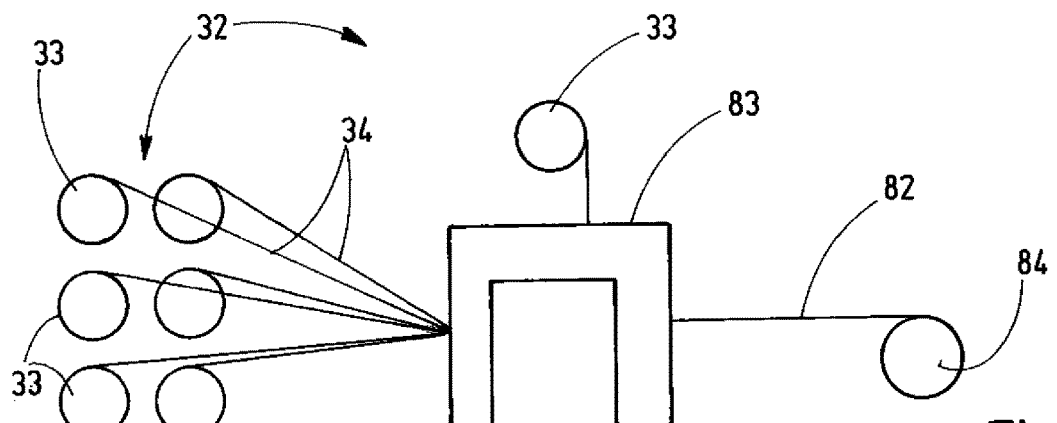
FIGS. 21 and 22 are schematic diagrams of a sample embodiment of a device and a process to produce of the reinforcing mesh shown in FIG. 20.
Figure 22:
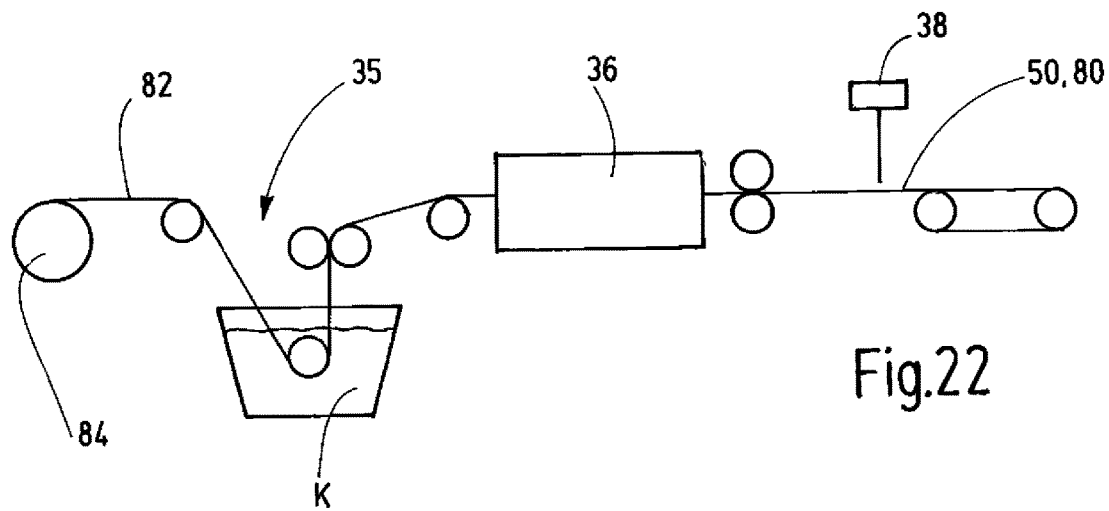

The principle of the process sequence for producing a reinforcing mesh 80 with a textile structure 82 is illustrated on the basis of a sample embodiment shown as an example in FIGS. 21 and 22, e.g., with the textile being soaked through a steeping bath process. The reinforcing threads 34 are fed in a textile machine 83, for example a loom or a knitting machine, where they are connected into the desired textile structure 82, for example a mesh structure. This textile structure 82 can be wound onto a storage roll 84, for example for interim storage. When needed, the textile structure 82 can be pulled off the storage roll 84 and embedded into the plastic matrix. This can be done by soaking the textile structure 82 with liquid plastic K in the bath 35, analogously to the sample embodiments according to FIGS. 1, 10, 11, and 12. The soaked textile structure 82 is then partly or completely hardened in a furnace, in a mold 36 or open. Finally, the reinforcing mesh 80 produced by doing this can be cut to the desired length by a cutting off tool 38.

The parts of the process shown separately in FIGS. 21 and 22 can also be combined with one another. The textile structure 82 produced in the textile machine 83 can also be fed directly to the bath 35. Temporary storage is not required.

The number of thread layers or groups of the textile structure 82 can vary. The textile structure 82 has at least two groups of reinforcing threads, the reinforcing threads 34 within a group running essentially parallel to one another. In the sample embodiment according to FIG. 20, two groups of reinforcing threads are provided, which are oriented approximately at right angles to one another. The reinforcing threads 34 of a common group form into approximately parallel strands, each with one or more reinforcing threads, which are arranged at a distance from one another. It is also possible to arrange, for example, three or more such groups of reinforcing threads 34. The angle at which the reinforcing threads of the groups intersect depends on the number and the orientation of the groups, and can be selected depending on the application.

In all cases, the textile structure 82 has sufficiently large meshes or openings 85, to be able to produce the bond with the concrete matrix 49.

The textile structure 82 can also have a reinforcing system with stretched reinforcing threads 34, which are held through a binding system with at least one connecting thread or are connected at the crossing locations 81. In the case of knitting, this can be done by a knitting thread. In the case of weaving, this can be done, for example, by a crossing thread. However, in the case of cross weaving it is also possible for the reinforcing threads 34 to be directly connected with one another. Here many possible embodiments and variations are conceivable.

FIGS. 17-19 schematically illustrate how a reinforcing element 50 and, according to the example, the reinforcing mesh 51, can be reshaped from its essentially two-dimensional shape into a three-dimensional shape. For example, it can be heated locally at one or more bending points 45, so that the cross-links there are released again. Then, it can be put into the desired shape with the help of a forming tool 57. Alternatively to the highly schematic illustration in FIGS. 18 and 19, the forming tool 57 can also have two forming tool parts 57, between which the reinforcing element 50 to be reshaped is enclosed or clamped, to put it into the desired shape.

FIGS. 4-7 schematically illustrate a process and a bending device 60 for bending reinforcing bar 30. According to the example, the reinforcing bar 30 is originally straight. According to the example, the bending device 60 comprises the energy input device 43 or the heating device 44, and a tool arrangement 61. The tool arrangement 61 also has a holding device 62, a forming tool 63 and, at the bending point 45, a first tool part 64 and optionally a second tool part 65. Starting from the bending point 45, a first bar section 30*a* of the reinforcing bar 30 extends in a first direction, and a second bar section 30*b* extends in another direction, according to the example in the opposite direction. The holding device 62 is set up to touch the first bar section 30*a* and to support the reinforcing bar 30 during the bending process. The forming tool 63 is set up to touch the second bar section 30*b*. The holding device 62 and the forming tool 63 are movable relative to one another, to bend the reinforcing bar 30 about a bend axis A. In the sample embodiment, the forming tool 63 is movable, while the holding device 62 can be stationary with respect to a machine base of the bending device 60. Alternatively or additionally, the holding device 62 could also be movable with respect to the machine base.

According to the example, the bend axis A is defined by the first tool part 64. The first tool part 64 is set up to support the reinforcing bar 30 at the bending point 64 on the inside of the bend BI. The inside of the bend BI of the reinforcing bar 30 is located on the side of the reinforcing bar 30 facing the bend axis A. Diametrically opposite the inside of the bend BI or opposite the inner bend side BI with respect to a central axis M (FIG. 8) of the reinforcing bar 30, there is, at the bending point 45, an outer bend side BA. The amount of curvature to be produced at the bending point 45 is greater on the inner bend side BI than on the outer bend side BA.

In the example illustrated here, a bend is produced at the bending point 45, which has an essentially constant radius on the inner bend side BI and on the outer bend side BA or on the concentric planes of bending between them. The amount of inside curvature is greatest on the inner bend side BI, or the bend radius is the smallest on the inner bend side BI. The amount of outside curvature on the outer bend side BA is the smallest or the bend radius is the greatest on the outer bend side BA (see especially FIG. 8). To produce the defined curvature, the first tool 64 has a working surface, whose curvature-producing inside curvature corresponds to the inner bend side BI. In the sample embodiment the first tool 64 and preferably also the second tool 65 is/are each formed by a reel or roller. At the point of contact with the inner bend side BI, the roller for the first tool 64 has a radius that corresponds to the radius to be produced on the inner bend side BI.

As is schematically illustrated in FIGS. 4-7, before the reinforcing bar 30 is bent it is locally heated at the bending point 45 by means of the heating device 44. Local heating has the advantage that outside of the bending point 45, the reinforcing threads 34 do not lose the tensile stress which they have when they are embedded into the plastic matrix.

After the local heating to release the cross-links, the reinforcing bar 30 can be reshaped at the bending point 45. On the first bar section 30_a_, the reinforcing bar is supported by the holding device 62. On the other side of the bending point 45, the forming tool 63 touches and executes a bending movement in the direction indicated by arrow P (FIGS. 6 and 7) on an arc about the bend axis A and/or a linear movement at a distance from the bend axis A. The forming tool 63 can be moved or slide in its extension direction relative to the second bar section 30_b_. It is also possible to clamp the second bar section 30_b_ solidly in the forming tool 63 if, for example, the first bar section 30_a_ is movable in its extension direction relative to the holding device 62.

While the bending movement in the direction indicated by arrow P is being performed, the reinforcing bar 30 is supported on the first tool part 64 and is given a defined bend.

Figure 9:
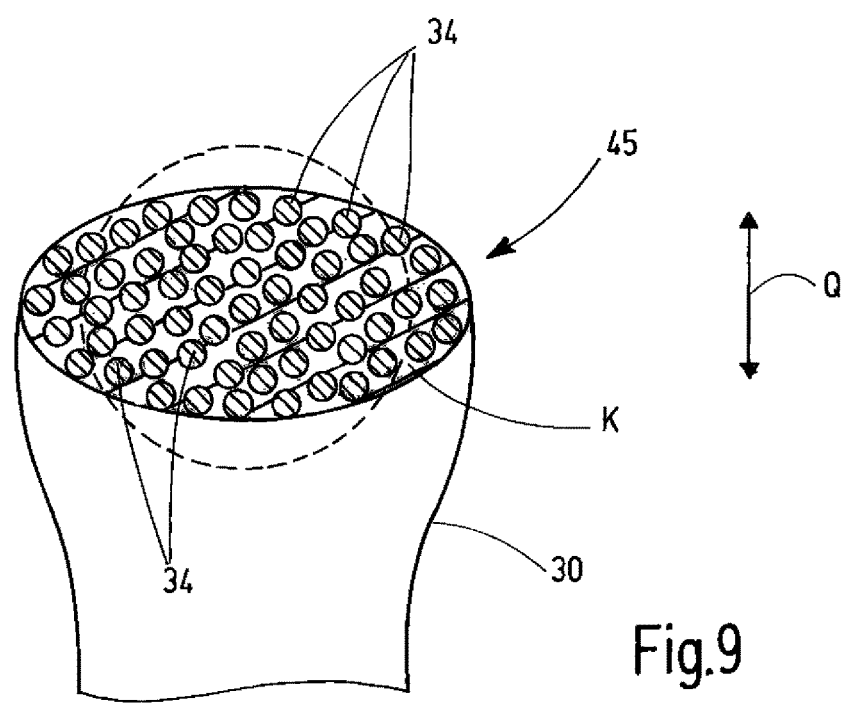
FIG. 9 is a cross section through the bending point of the reinforcing bar along the line IX-IX in FIG. 8.

In the preferred sample embodiment described here, after the cross-links are released at the bending point 45 the cross sectional contour of the reinforcing bar 30 is reshaped at the bending point 45. To accomplish this, the two tool parts 64, 65 are moved relative to one another in a transverse direction Q and press against the reinforcing bar 30 from opposite sides to reshape its cross sectional contour (FIG. 6). This reduces the dimension of the reinforcement 30 in the transverse direction Q at the bending point 45 and increases its dimension at right angles to the transverse direction Q and parallel to the bend axis A (FIG. 9). FIG. 9 schematically illustrates how the originally circular cross section (illustrated by the dashed line) is reshaped at the bending point 45 and given an essentially oval or elliptical contour, the dimension of the cross section in the transverse direction Q being smaller than the dimension at a right angle to it.

This reshaping or shaping by means of the two tool parts 64, 65 causes the reinforcing threads running next to the inner bend side BI to stretch, so to speak, in the area of the bending point 45, and to be shifted away from the inside of the bend BI. This prevents the reinforcing threads 34 forming waves in the area of the inner bend side BI and weakening the tensile strength of the reinforcing bar 30 or of a reinforcing element 50 produced from it. On the opposite outer bend side BA, the reinforcing threads 34 are shifted away from the outer bend side BA due to the increasing path. The amount of the cross-sectional surface of the reinforcing bar 30 remains essentially constant at the bending point 45. Only the dimensions in the transverse direction Q and at a right angle to it change.

This reshaping of the cross sectional shape of the reinforcing bar 30 at the bending point 45 can be performed before the bending movement is performed (cf. FIGS. 6 and 7). It is also possible also to carry out the bending movement in the direction indicated by arrow P simultaneously with the deformation of the cross sectional contour (FIG. 6), at least in phases (FIG. 7).

In the sample embodiment described up to now, the reinforcing bar 30 has an essentially planar outside surface. This outside surface should be understood to mean a surface whose unevenness is defined by the plastic K that is used. In a variant sample embodiment, this outside surface can also have projections and/or depressions, producing an uneven or rough outside surface, the unevenness and/or roughness being greater than the unevenness or roughness produced by the plastic K itself.

A first possible way of doing this is to put a rib element 70 on the reinforcing bar 30 while it is being produced or after it has been produced. The rib element 70 can be formed, for example, by a line-like element that is put on in the area of the outside surface of the reinforcing bar in the shape of a screw or helix. The rib element 70 can be produced from a reversibly cross-linked resin system or a thermoset resin such as, for instance an epoxy resin or vinyl ester resin, and reinforcing threads 34, e.g., in a pultrusion process (FIG. 10) that can be carried out analogously to the production of the reinforcing bar 30. Only the number of the reinforcing fibers 34 used is smaller, forming a rib element 70 whose cross section is thinner. The rib element 70 produced can be wound onto the outside surface during the production process of the reinforcing bar 30 before hardening or complete hardening of the plastic K, and it then connects with the reinforcing bar 30 while the plastic K hardens.

The production process of the reinforcing bar 30 can proceed analogously to the process portrayed by FIG. 1. Following the mold 36, a winding unit 71 then winds the rib element 70 in a helix around the reinforcing bar 30, which has not yet hardened. For example, the winding unit 71 can revolve around the reinforcing bar 30, while the latter is moved in its extension direction S by the pull-off device. Finally, the reinforcing bar 30 is cut to the desired length, according to the example by means of the cutting off tool 38. This process can be called "hard into wet", since the already hardened rib element 70 is introduced into the not yet hardened plastic matrix of the reinforcing bar 30.

As an alternative to this, it is also possible to perform a "wet into wet" process. This involves putting the rib element 70 onto the reinforcing bar 30 while the rib element 70 is in the not yet hardened state, but rather is also in the heated state with released cross-links. This can be done either by reheating the prefabricated rib element 70, to release the cross-links or by producing the rib element 70 simultaneously with the reinforcing bar 30 and feeding the not yet hardened rib element 70 to the production device 31 to produce the reinforcing bar 30 and then winding it onto the not yet hardened reinforcing bar 30 (analogously to the preceding process "hard into wet").

Ribbing the reinforcing bar 30 can improve the bond of the reinforcing bar 30 or of the reinforcing element 50 with a concrete component 48. The advantage of the use of a reversibly cross-linked resin is that after the cooling and re-cross-linking of the resin the ribbing has higher strength and smaller tendency to creep, since the connection is made through the cross-linked polymer and thus covalent bonds.

Alternatively or additionally, the bond between the reinforcement and the concrete can also be improved by putting particles 72, such as, for instance grains of sand, into the plastic matrix of the reinforcing bar 30. This makes it possible to give the outside surface of the reinforcing bar an uneven or rough structure with elevations and depressions that are the size of the particles, which is greater than the unevenness or roughness of the plastic K of the plastic matrix.

A first possibility for introducing particles 72 into the plastic matrix of the plastic K is illustrated in FIG. 12. In this figure, the production device 31 for producing the reinforcing bar 30 has a particle introduction device 73 following the mold 36. Before the plastic K hardens, in the particle introduction device 73 the particles 72 are put onto the not yet hardened surface or outside surface of the plastic K, for example by directing a flow of gas that carries the particles 72 onto the outside surface of the plastic K. The kinetic energy or energy of impact and/or the application of additional pressure in the particle introduction device 73 causes the particles 72 to go at least partially into the plastic matrix and in this way to penetrate the surface of the thermoplastic phase of the plastic K. This achieves a rough or uneven outside surface. The hardening of the plastic matrix causes the particles 72 to connect with the plastic K. The other steps of the process are analogous to those of the production process using the production device 31 portrayed in FIG. 1.

Alternatively to the process according to FIG. 12 the particles 72 can also be applied following the production of the reinforcing bars 30, according to the process shown in FIG. 1 and described above. To accomplish this, the reinforcing bar 30 can be heated by a heating device 44, so that the plastic K changes back into its thermoplastic phase. Then, the particle introduction device 73 can introduce the particles 72 into the plastic matrix in the area of the outside surface, analogously to the process according to FIG. 12. This also makes it possible to provide the reinforcing bars with sand or with particles 72 only in those parts where it is technically necessary.

It is also possible to apply both a rib element 70 and also particles 72. The combination can also be spatially limited.

The invention relates to a concrete component 48, having a concrete matrix 49 and having at least one reinforcing element 50, which has at least one reinforcing part 29, a method for producing said concrete component, to a production device 31, to a method for reshaping or bending a reinforcing element 50, and to a bending device 60 and also a method for connecting at least two reinforcing parts 29. If is essential to the invention that the at least one reinforcing part has a plurality of reinforcing threads 34 or reinforcing yarn arranged in a plastic matrix of a plastic K. The plastic K is designed as a plastic that can be reversibly cross-linked. It has molecular chains, in particular polymer chains, which contain cross-links that can be reversibly produced. Most of the cross-links, at least 50%, can be released by inputting energy, especially heat, into the plastic K and reestablished by recooling. This makes it possible to produce and store a reinforcing element 50 in completely hardened form as a standard element, such as, for instance a reinforcing bar with a single reinforcing part or as a reinforcing mesh with reinforcing parts that are connected to one another at an oblique or at a right angle. In accordance with the particular application, the produced reinforcing element 50 can be reshaped into the desired shape in that the cross-links are released in one or more locations by inputting energy, the reinforcing element is reshaped, and then the reinforcing element is hardened again by reestablishing the cross-links. This process can be repeated multiple times, so that it is also possible, for example to adapt the reinforcing element at the construction site.

LIST OF REFERENCE NUMBERS

30 Reinforcing bar
30a First bar section
30b Second bar section
31 Production device
32 Creel
33 Bobbin
34 Reinforcing threads
35 Bath
36 Mold
37 Pull-off device
38 Cutting off tool
43 Energy input device
44 Heating device
45 Bending point
46 Ultrasound device
46a Sonotrode
46b Forming tool end
47 Counterholding tool
48 Concrete component
49 Concrete matrix
50 Reinforcing element
51 Reinforcing mesh
52 Support
53 First layer
54 Second layer
55 Pressing arrangement
56 Roller
57 Forming tool
58 Connection point
60 Bending device
61 Tool arrangement
62 Holding device
63 Forming tool
64 First part of tool
65 Second part of tool
70 Rib element
71 Winding unit
72 Particles
73 Particle introduction device
80 Reinforcing mesh
81 Crossing location
82 Textile structure
83 Textile machine
84 Storage roll
85 Opening
A Axis of bend BA Outer bend side
BI Inner bend side
d Thickness of reinforcing element
K Plastic
M Central axis
Q Transverse direction
S Extension direction

The invention claimed is:

1. A concrete component (48) comprising:
a concrete matrix (49) into which at least one reinforcing element (50) is embedded for reinforcement,
the reinforcing element (50) having at least one reinforcing part (29) extending in an extension direction (S) and having at least one reinforcing thread (34), and
the at least one reinforcing thread (34) being arranged in a plastic matrix of the reinforcing part (29), this plastic matrix consisting of a reversibly cross-linked plastic (K) whose cross-links can be reversibly broken and reestablished after the plastic matrix has been completely hardened in which the plastic matrix is cross-linked.

2. A concrete component according to claim 1, wherein the reinforcing element (50) is in the form of a reinforcing bar (30).

3. A concrete component according to claim 2, wherein the reinforcing bar (30) extends in a straight direction in at least one bar section (30*a*, 30*b*) or along an entire length of the reinforcing bar (30).

4. A concrete component according to claim 3, wherein the reinforcing threads (34) of the reinforcing bar (30) are arranged in the plastic matrix under tensile stress along the straight at least one bar section (30*a*, 30*b*) or over the entire length.

5. A concrete component according to claim 2, wherein the reinforcing bar (30) includes at least one reinforcing bar (30) that has at least one bending point (45).

6. A concrete component according to claim 5, wherein at the bending point (45) at least some of the at least one reinforcing thread (34) extend at an angle to the extension direction (S), their distance to a central axis (M) of the reinforcing bar (30) being reduced.

7. A concrete component according to claim 5, wherein the bending point (45) has an inner bend side (BI) with an inside curvature and an outer bend side (BA) opposite the inner bend side (BI) with respect to a central axis (M) of the at least one reinforcing bar (30), the outer bend side having an outside curvature, the inside curvature of the reinforcing bar being greater than the outside curvature and none of the reinforcing threads (34) having a curvature at the bending point (45) that is greater than the inside curvature.

8. A concrete component according to claim 1, wherein the reinforcing element (50) includes one or both of:
at least two of the at least one reinforcing part (29) that are connected together
or
multiple reinforcing bars (30) that are connected together.

9. A concrete component according to claim 8, wherein the reinforcing bars (30) are connected exclusively by respective plastic matrices of the reinforcing bars (30) being connected together.

10. A concrete component according to claim 1, wherein every reinforcing part (29) has multiple reinforcing threads that form a textile structure (82) with one or both of crossing locations (81) or textile binding locations, and that the textile structure (82) is embedded into the plastic matrix.

11. A concrete component according to claim 1, wherein a reinforcing bar (30), which includes at least one reinforcing bar (30), or one of the at least one reinforcing part (29) that has one or both of a rough or uneven outside surface, where one or both of: at least one rib element (70) projects from an adjacent area of the outside surface or multiple particles (72) are embedded into the plastic matrix.

12. A concrete component according to claim 1, wherein the plastic (K) of the plastic matrix is cross-linked at room temperature and at least 50% of the cross-links can be released by inputting energy (E).

13. A concrete component according to claim 1, wherein the plastic (K) of the plastic matrix has a glass-transition temperature of at least 50° C.

14. A concrete component according to claim 1, wherein the plastic (K) of the plastic matrix of the at least one reinforcing part (29) has a glass-transition temperature of no more than 150° C.

15. A concrete component according to claim 1, wherein the reversibly cross-linked plastic (K) has at least two components, at least one of which is formed from a polymer.

16. A concrete component according to claim 1, wherein the reversibly cross-linked plastic (K) are cross-linked by a Diels-Alder reaction and the cross-links are configured to be broken by a retro-Diels-Alder reaction.

17. A concrete component according to claim 1, wherein the reversibly cross-linked plastic (K) contains a first component with at least two dienophile groups.

18. A concrete component according to claim 17, wherein the reversibly cross-linked plastic (K) has a second component with at least two diene functionalities.

19. A concrete component according to claim 1, wherein one or both of at least some of the cross-links of the reversibly cross-linked plastic (K) are configured to be broken by one or both of electromagnetic radiation or ultrasound excitation, or at least some of the cross-links of the reversibly cross-linked plastic (K) are configured to be cross-linked by electromagnetic radiation.

20. A production process for a concrete component (48) with a concrete matrix (49) and at least one reinforcing element (50) that has at least one reinforcing part (29), the process comprising:
introducing multiple reinforcing threads (34) into a plastic matrix made of a reversibly cross-linked plastic (K) whose cross-links can be reversibly broken and reestablished after the plastic matrix has been completely hardened in which the plastic matrix is cross-linked;
hardening the plastic matrix to produce the at least one reinforcing part (29) of the reinforcing element (50);
embedding the at least one reinforcing part (29) of the reinforcing element (50) into the concrete matrix (49);
hardening the concrete matrix (49).

21. A process according to claim 20, further comprising soaking the reinforcing threads (34) in the liquid plastic (K) of the plastic matrix and then hardening the plastic (K) in one or both of a mold (36) or a furnace.

22. A process according to claim 20, further comprising laying the reinforcing threads (34) into a mold (36), then placing liquid plastic (K) of the plastic matrix into the mold (36), and then hardening.

23. A process for bending a reinforcing bar (30) that extends in an extension direction (S) and has at least one reinforcing thread (34), the at least one reinforcing thread (34) being arranged in a plastic matrix of the reinforcing bar (30), the plastic matrix consisting of a reversibly cross-linked plastic (K) whose cross-links can be reversibly broken and reestablished, the process comprising:
inputting energy at a bending point (45) to release the cross-links of the plastic (K) of the plastic matrix, which had been completely hardened in which the plastic matrix is cross-linked;

bending the reinforcing bar (30) at the bending point (45);

hardening the reinforcing bar (30) at the bending point (45).

24. A process according to claim 23, further comprising reshaping the cross sectional shape of the reinforcing bar (30) at the bending point (45) after the cross-links are released and before the bending.

25. A bending device (60) for bending a reinforcing bar (30) that extends in an extension direction (S) and that has at least one reinforcing thread (34), the at least one reinforcing thread (34) being arranged in a plastic matrix of the reinforcing bar (30), the plastic matrix consisting of a reversibly cross-linked plastic (K) whose cross-links can be reversibly broken and reestablished after the plastic matrix has been completely hardened in which the plastic matrix is cross-linked, a first bar section (30*a*) of the reinforcing bar (30) extending in one direction starting from the bending point (45) and a second bar section (30*b*) extending in another direction starting from the bending point (45), the bending device comprising:

an energy input device (43) configured to input energy at a bending point (45) of the reinforcing bar (30) to release the cross-links of the plastic (K) of the plastic matrix;

a tool arrangement (61), that has, at an inside of a bend (BI) of the bending point (45), a first tool part (64) configured to support the reinforcing bar (30) inside of the bend (BI);

the tool arrangement (61) having a holding device (62) configured to support the first bar section (30*a*) of the reinforcing bar (30) and a forming tool (63) configured to touch the second bar section (30*b*) of the reinforcing bar (30), the forming tool (63) configured to execute a bending movement of the second bar section (30*b*) relative to the first bar section (30*a*).

26. A bending device according to claim 25, wherein the tool arrangement (61) has a second tool part (65) that configured to touch an outside of the bend (BA) of the reinforcing bar (30) at the bending point (45) and to press the reinforcing bar (30) against the first tool part (64).

27. A bending device according to claim 26, wherein one or both of the first tool part (64) or the second are configured to reshape a cross sectional shape of the reinforcing bar (30) at the bending point (45) before or during execution of the bending movement.

28. A process to connect reinforcing parts (30) that have at least one reinforcing thread (34) arranged in a plastic matrix of the reinforcing part (29), the plastic matrix consisting of a reversibly cross-linked plastic (K) whose cross-links can be reversibly broken and reestablished after the plastic matrix has been completely hardened in which the plastic matrix is cross-linked, the process comprising:

inputting energy at at least one connection point (58) into at least one of the reinforcing parts (29) to be connected to release the cross-links of the plastic (K) of the plastic matrix;

bringing the reinforcing parts (29) to be connected into contact at the respective connection point (58);

hardening the at least one reinforcing part (29) at the connection point (58).

\* \* \* \* \*